United States Patent [19]
Coleman et al.

[11] 3,814,356
[45] June 4, 1974

[54] ELECTRON MICROSCOPE

[76] Inventors: John W. Coleman, Prince St. & Strawbridge Rd., Northumberland, Pa. 17857; James J. McGinnis, RD No. 1, Milton, Pa. 17847; John R. Fairbanks, 735 Buffalo Rd., Lewisburg, Pa. 18102; Joseph J. Schuler, 836 Chestnut St., Mifflinburg, Pa. 17844; Patrick H. McLaughlin, 625 Pennsylvania St., Lewisburg, Pa. 18102; Andre A. Hoffman, 29 Jonathan Rd., Shamokindam, Pa. 17872; Kirk C. Newton, 114 E. Green St. Box 47, Mifflinburg, Pa. 17844; George E. Johnson, Milton Rd. No. 1, Milton, Pa. 17847

[22] Filed: Oct. 2, 1970

[21] Appl. No.: 77,718

[52] U.S. Cl. ............................. 248/18, 248/358 R
[51] Int. Cl. ......................... F16f 7/00, F16f 9/346
[58] Field of Search ....... 248/18, 15, 23, 13, 358 R, 248/180, 181, 182; 250/49.5 A; 308/DIG. 1

[56] References Cited
UNITED STATES PATENTS

| 901,329 | 10/1908 | Ehret | 248/18 X |
|---|---|---|---|
| 2,915,902 | 12/1959 | Brugger | 308/DIG. 1 UX |
| 3,016,273 | 1/1962 | Benoit | 308/DIG. 1 UX |
| 3,021,956 | 2/1962 | Bochan | 248/18 X |
| 3,026,150 | 3/1962 | Buckley et al. | 308/DIG. 1 UX |
| 3,176,507 | 4/1965 | Digesu et al. | 308/DIG. 1 UX |
| 3,248,542 | 4/1966 | Nixon | 250/49.5 A |
| 3,297,284 | 1/1967 | Pellerin | 248/18 |

OTHER PUBLICATIONS

"The Electron Microscope", by E. F. Burton et al., page 225, published in 1946.

Primary Examiner—J. Franklin Foss

[57] ABSTRACT

A vibration eliminating support system for a sensitive instrument. The support system includes a bearing which supports the instrument in pendulum fashion such that external vibrations and movement of the support are transformed to long period swinging motion of the instrument. This prevents relative movement of the parts of the instrument with the result that vibrations and shock have no effect on the accuracy of the instrument. The support system has particular utility for vibration isolation of a rigid column of an electron microscope which is suspended on the bearings for pivotal movement. Advantageously, the bearings are air bearings to maintain friction of the bearing surfaces at an absolute minimum.

12 Claims, 31 Drawing Figures

INVENTORS
JOHN W. COLEMAN
JAMES J. McGINNIS
JOHN R. FAIRBANKS
JOSEPH S. SCHULER
PATERICK H. McLAUGHLIN
ANDRE A. HOFFMAN
KIRK C. NEWTON
GEORGE E. JOHNSON
BY WALTER KRUGER
ATTORNEY

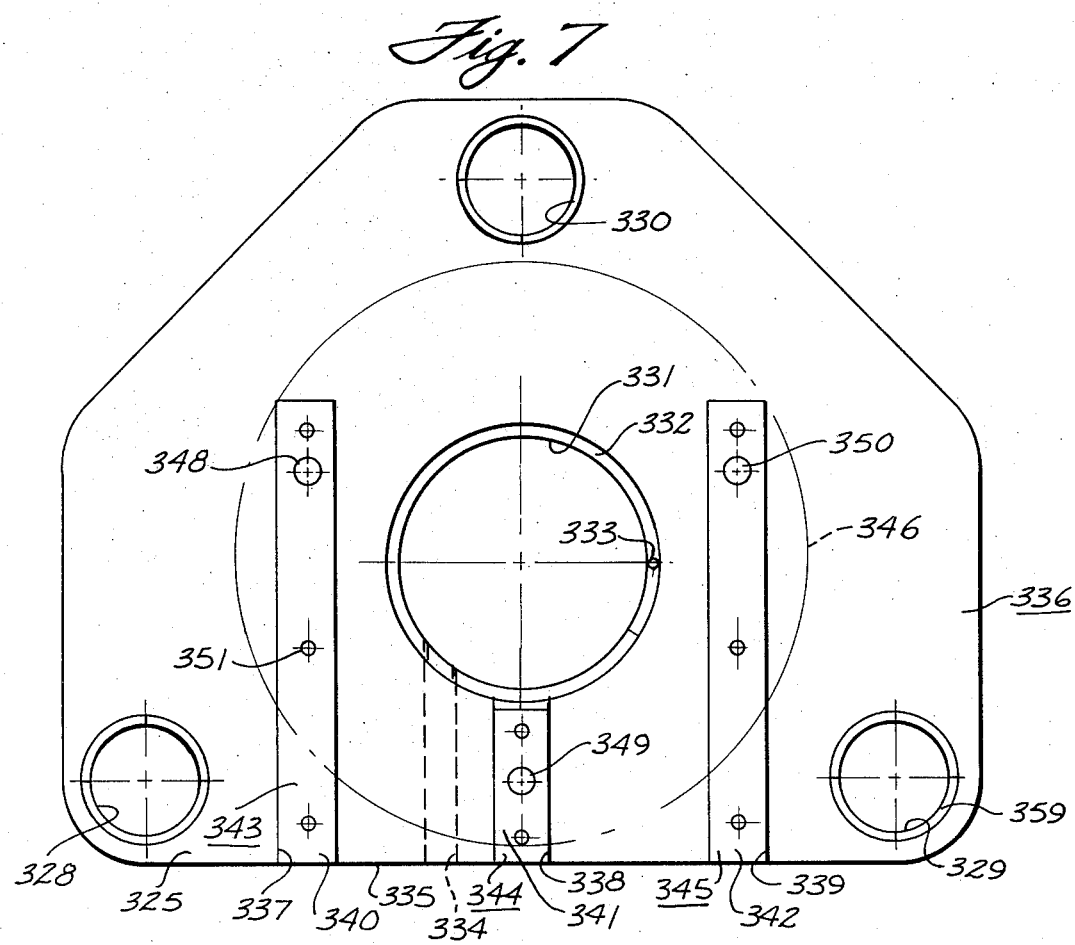
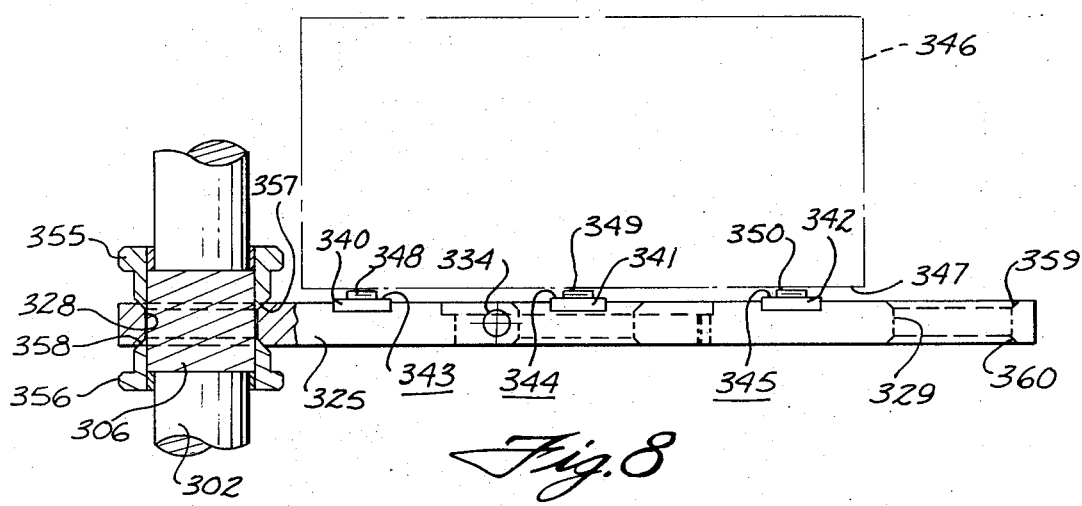

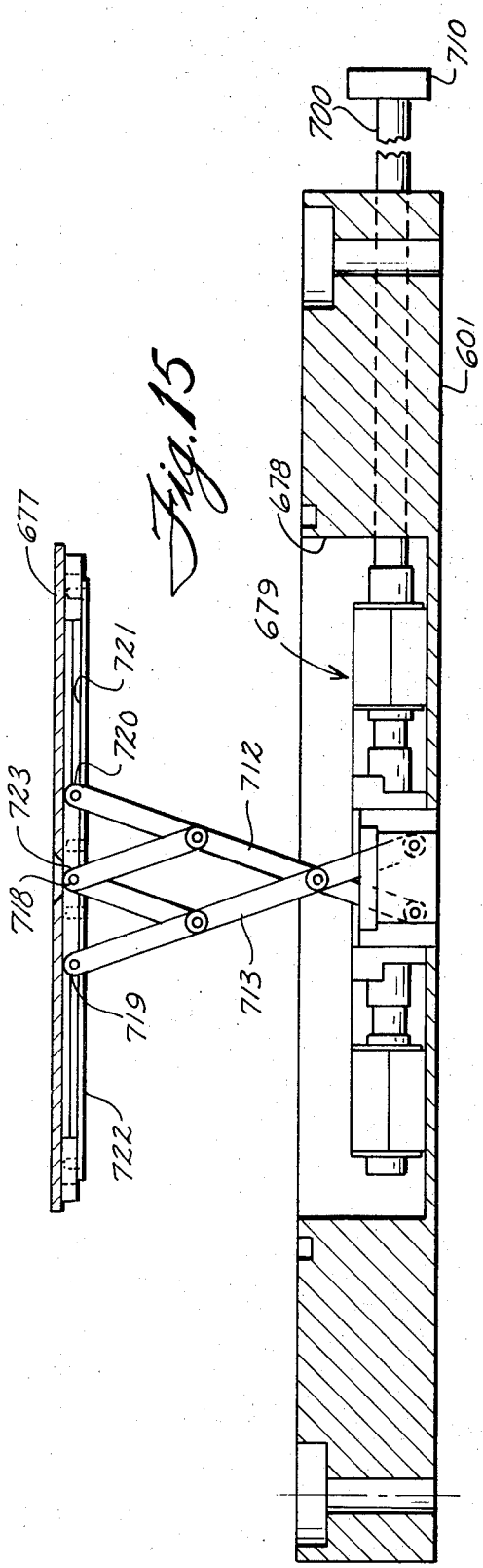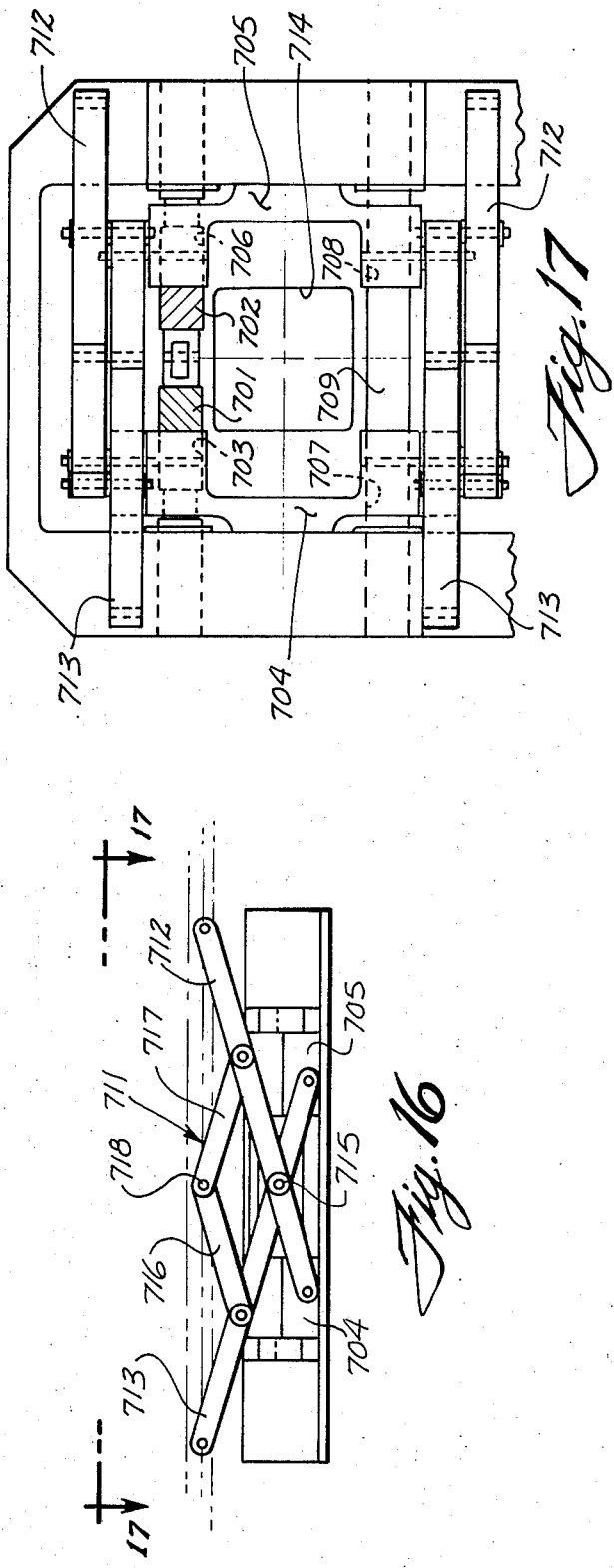

ELECTRON MICROSCOPE

This invention relates generally to electron microscopes and particularly to an electron microscope of extremely high resolution, and which is also exceptionally immune to vibration from external sources.

More specifically, the invention relates to an electron microscope of unique construction in which the critical working parts of the microscope are on a column supported in a pendulum fashion from a support. While the support for the column includes a fluid bearing which provides exceptional isolation of the column from external vibrations, this fluid bearing arrangement can indeed by used with other types of instruments where it is desired that the instrument be substantially completely isolated from the effect of external vibrations.

Among the features of the electron microscope of this invention are the following:

1. A unique overall construction including a suspended column with numerous advantageous features including simple conversion from a transmission microscope to a scanning microscope.
2. A pendulum type support for the microscope column including a gas bearing to provide for substantially complete attenuation of any external shock and vibration, so the column is effectively isolated.
3. A unique column arrangement with shelves to independently support selected lenses of the system relative to each other, each of these shelves including means to adjust the shelves vertically as well as to adjust the inclination of the shelves and correspondingly, the lenses, relative to each other. The adjustable shelf arrangement also provides for rapid replacement of lenses or substitution of other units, such as a scanning unit, in place of certain lenses, and a unique expandable vacuum seal provides for removing certain lenses without disturbing adjacent lenses.
4. A unique low profile vacuum seal energizable from externally of the column and which adds no substantial height to the column.
5. A unique objective including upper and lower lens sections with a specimen chamber therebetween, and unique means for magnetically connecting the respective magnetic circuits of the upper and lower lens sections.
6. A unique viewing screen movable to a horizontal position for normal viewing by the operator, movable to a downwardly tilted position in which the screen is perpendicular to the axis of a binocular optical system to permit viewing the point of impingement of the center of the electron beam at the central axis of the binocular system, and further movable to a completely retracted position in which the electron beam has an unimpeded path to impinge on a photographic plate located in a camera section of the microscope below the screen.
7. A unique viewing arrangement wherein a seated operator of the microscope can directly observe the viewing screen from the front of the instrument and a seated observer at the rear of the instrument can simultaneously directly observe the screen in its horizontal position; and wherein a mirror permits simultaneous indirect viewing of the screen by the observer at the rear of the instrument when the screen is in its downwardly tilted position.
8. A unique column arrangement where the high voltage power supply is at the top of the column and supports a cathode, and in which the power supply is movable in first and second directions transverse to the axes of the beam emitted by the cathode.
9. A unique cathode and power supply unit in which the cathode is removable and replaceable via an access opening without disturbing the gun or power supply.
10. A unique lens construction wher the pole pieces for most of the lenses of the microscope are identical to permit using the best machined and most perfect pole piece in the most critical lens of the system.
11. A unique control system for obtaining a photograph wherein a shutter is positioned above the viewing screen, a retractable gate is below the viewing screen, and the control operates to automatically close the shutter just before the gate is retracted (to prevent unwanted impingement of the electron beam on the photographic plate below the screen), so a photograph can then be taken by opening the shutter, yet maintains the shutter open when the viewing screen is in its horizontal or forwardly tilted positions to permit impingement of the beam on the screen.

While electron microscopes fall in a highly developed art, and while these instruments have been known and used for several decades, prior known instruments have some disadvantages. For example, in the prior instruments, the several lenses of the instruments are either support by other lenses, or in some instances the lenses themselves are mounted in interfitting relation to each other. With such an arrangement it is necessary to remove all the lenses in order to inspect or replace one lens of the microscope. Since the lenses must be precisely adjusted axially and transversely relative to each other, reassembly of such prior art columns is indeed time consuming. Similarly, in prior art electron microscopes, where it is desired to replace a particular lens with a lens of different characteristics or with a scanning unit, it is necessary to disassemble the entire column and then reassemble same with the lenses again in precise alignment. Needless to say, when replacement or substitution of a lens is required in the prior art instruments, the task is a major undertaking. By virtue of the unique shelf arrangement on which the lenses of the electron microscope of this invention are supported, several of the lenses or pairs of lenses can be removed and replaced without disturbing the position of or alignment of the remaining lenses relative to the electron beam source. Such replacement of lenses is further facilitated by virtue of a unique expandable seal located between adjacent lenses and which can be axially expanded to energize the seal against facing surfaces of the lenses. Hence, in order to remove or replace a lens it is merely necessary to first disengage or de-energize the vacuum retaining seals at the opposite faces of the lens, whereupon, the lens can be readily removed from the unit in a direction transverse to the axis of the microscope column. A scanning system can be installed after selected lenses are removed.

By virtue of the unique overall construction of this electron microscope, the operator of the microscope sitting at the front of the instrument (where the controls for the instrument are conveniently located) can directly view the viewing screen when the screen is in both its horizontal or forwardly tilted positions. In addition, a second observer can directly view the screen, when the screen is horizontal, from a seated position at the rear of the instrument and can also view the screen via a mirror arrangement when the screen is in the forwardly tilted position. A distinct advantage of this arrangement is that each observer is comfortably seated and can therefore view the image on the screen for long periods of time without fatigue or other discomfort.

The suspension system for the microscope column provides for substantially complete attenuation of vibration from external sources which otherwise could vibrate the cathode or deflect portions of the column relative to each other thereby changing the position of the electron beam on, for example, a photographic plate at the instant a photograph is being taken. The extent of vibration attentuation as a result of shock or vibration on the floor of the building in which the instrument is installed, is on the order of $5 \times 10^{-5}$. By virtue of this arrangement, vibrations from external sources caused, for example, by trucks passing by the building where the instrument is installed, or some unexpected shock, for example, dropping a shipping crate during unloading in the building, are not transmitted to the column.

The column includes plural shelves suspended from three spaced apart support rods. Each shelf is adjustably secured to each support rod. This arrangement permits moving the shelves vertically, independently of each other, within predetermined limits, as well as tilting the shelves relative to each other to provide the desired inclination of various lenses relative to other lenses of the system, if necessary. Several of the lenses are also adjustable transversely of each other on the shelves. As a result of manufacturing tolerances, for example, it may be necessary to tilt one or several lenses so the geometric axis of a lens is skew to or at an angle to the axis of another lens of the system. Such adjustment can be readily accomplished in accordance with this invention.

Also mounted in the column are a plurality of mechanically energizable low profile vacuum seal assemblies. Such a seal assembly is provided between selected lenses of the system and is so constructed that it performs the necessary sealing function without physically supporting the components of a lens. A seal assembly is located in a recess in each of the shelves save for the objective shelf, and in the retracted position of the seal, the seal components are retracted within the upper and lower surfaces of the shelf. This permits ready removal of a lens merely by sliding the lens along its shelf, after the seal is retracted. The vacuum seal assembly is of a unique construction including a pair of oppositely facing seal surfaces which are moved apart relative to each other to energize the seal. Similar seal assemblies are provided at the top and bottom of the objective lens to seal the lens to the adjacent lenses in the column. The several seals can be individually energized from a convenient location at the front of the instrument via suitable screws which are manually manipulated.

The adjustable shelf for the objective lens has the specimen chamber formed therein. The microscope of this invention is of the type in which the specimen is placed between upper and lower portions of the objective lens system. As is customary, in such an arrangement, there is only a relatively narrow space between the pole pieces of the objective lens to receive the specimen at the axis of the electron beam. In addition, because the upper and lower sections of the objective lens co-operate with each other, it is necessary to magnetically connect the casings of the two lenses together to obtain the desired effect on the electron beam. In accordance with this invention, the magnetic coupling or strapping is accomplished by the use of a plurality of cylindrical magnetic material straps which firmly abut and thereby magnetically interconnect the upper and lower portions of the objective lens while providing sufficient circumferential space between adjacent straps for the usual pole piece centering screws, vacuum drawings ports and specimen manipulating and holding device.

By virtue of the unique viewing screen arrangement of this invention, an observer at the front of the instrument can view the screen in both a horizontal position as well as in a forwardly tilted position in which the screen is perpendicular to the axis of a binocular system adapted to be mounted on the front of the instrument adjacent the viewing window. The forward tilt of the screen is provided for by lowering the front of the screen on a pivot at the rear of the screen. Hence, in the dropped down or forwardly tilted position, the screen is lowered relative to its horizontal position with a corresponding slight increase in magnification from the electron beam.

The viewing screen is so constructed that it is also movable to a completely retracted position in which an unimpeded path is provided for the electron beam to impinge on a photographic plate which can be mounted in the instrument at a location below the screen. To simplify the picture taking operation, the control for the screen is effective to withdraw a gate positioned below the screen during the movement of the screen to its retracted position. The control is so arranged that a camera shutter at a location above the screen is automatically moved to a closed position before either the screen or the gate are retracted. This interconnecting arrangement assures that electrons from the electron beam source will not impinge on the photographic plate until the desired time. The camera shutter can then be selectively opened to obtain the desired exposure of the photographic plate.

The magnetic material pole pieces used in electron microscopes are formed from, for example, a pure iron which is precisely machined to provide a pole piece of the desired characteristics. Frequently, because of the manner in which the material for the pole pieces is made, there are inclusions or slight discontinuities in the material which greatly affect the performance of a lens equipped with the pole piece. It has also been found that in some lenses, depending on location and type, it is necessary to have a very precisely machined completely homogeneous pole piece or the lens functions improperly. By the use of identical pole pieces in each and every lens of the magnetic lens system of this microscope, the pole pieces can be interchanged with each other. By virtue of this interchangeability, the pole piece which exhibits the best characteristics can be placed in the most critical lens or lenses. In the past, it was necessary to sometimes machine a dozen or so pole pieces before one was found with the characteristics required to cause the lens to function properly.

An additional unique feature of the electron microscope of this invention is a self-contained high voltage power supply mounted directly on the top of the column which supports the several lenses of the microscope. In the preferred construction, the high voltage power supply is mounted in a cannister seated on top of the yoke which supports the microscope column. The cathode is suspended from the top of the cannister and is disposed in a position spaced above a centrally located vertically adjustable anode. The suspending device for the cathode includes a closed gas-filled cannister so the low voltage system to heat the cathode is completely isolated from the high voltage power supply which is maintained in vacuum and communicates with the central vacuum system of the column. The cannister containing the high voltage power supply and from which the cathode is suspended is arranged for movement on the yoke so the cathode can be precisely centered with the axis of the column by moving the entire power supply. By virtue of a unique mounting arrangement for the cathode, including a plug in connection and an access opening through the high voltage casing, the cathode can be readily replaced merely by uncovering the opening, unplugging the old cathode, and inserting a new cathode.

An additional advantageous feature of the high voltage power supply system is its module construction which permits changing the high voltage output by merely adding to removing module units from the system. The several units of the module are magnetically energized and are electrically connected in series so the voltage output depends on the number of modules. This arrangement where the voltage from the high voltage source can be readily changed adds further to the versatility of the microscope of this invention.

In accordance with this invention, the diffusion pump customarily used to maintain the extremely high vacuum necessary to permit the electron beam to be accelerated and directed in the proper controlled manner, is supported on the vibration isolated portion of the microscope. In addition, the usual mechanical vacuum pump is connected to the output of the diffusion pump, but the mechanical pump is not supported on the isolated column. However, the piping from the mechanical pump to the diffusion pump includes a flexible hose that extends along the node point of the bearing which supports the column, and by virtue of this arrangement, there is only a slight torsional force acting on this hose and no vibration whatever is transmitted to the column by the hose.

Numerous other advantages and features of the electron microscope of this invention will become apparent with reference to the drawings which illustrate a preferred embodiment of this invention, and in which:

FIG. 7 is a top plan view of one of the lens support shelves of the microscope;

FIG. 8 is a front view in elevation of the shelf of FIG. 7 with portions thereof shown in section to better illustrate the details of the shelf;

FIG. 15 is an enlarged sectional view in side elevation showing the anode adjusting mechanisms;

FIG. 16 is a partial view corresponding to FIG. 15 and showing the anode adjusting mechanism in a lowered position;

FIG. 17 is a top plan view taken along line 17—17 of FIG. 16;

Figure 1:
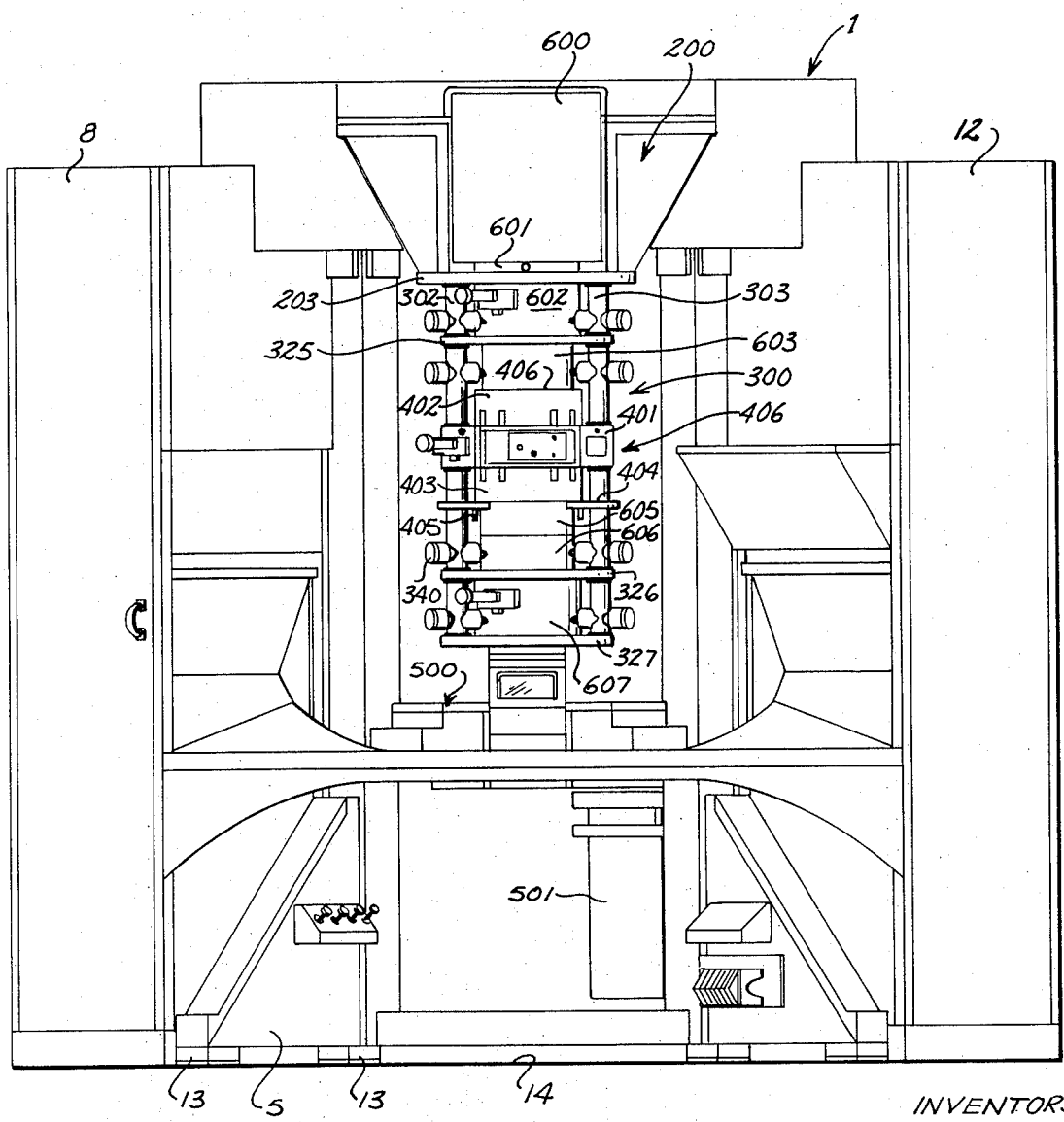
FIG. 1 is a front view in elevation of the electron microscope of this invention.
Figure 2:
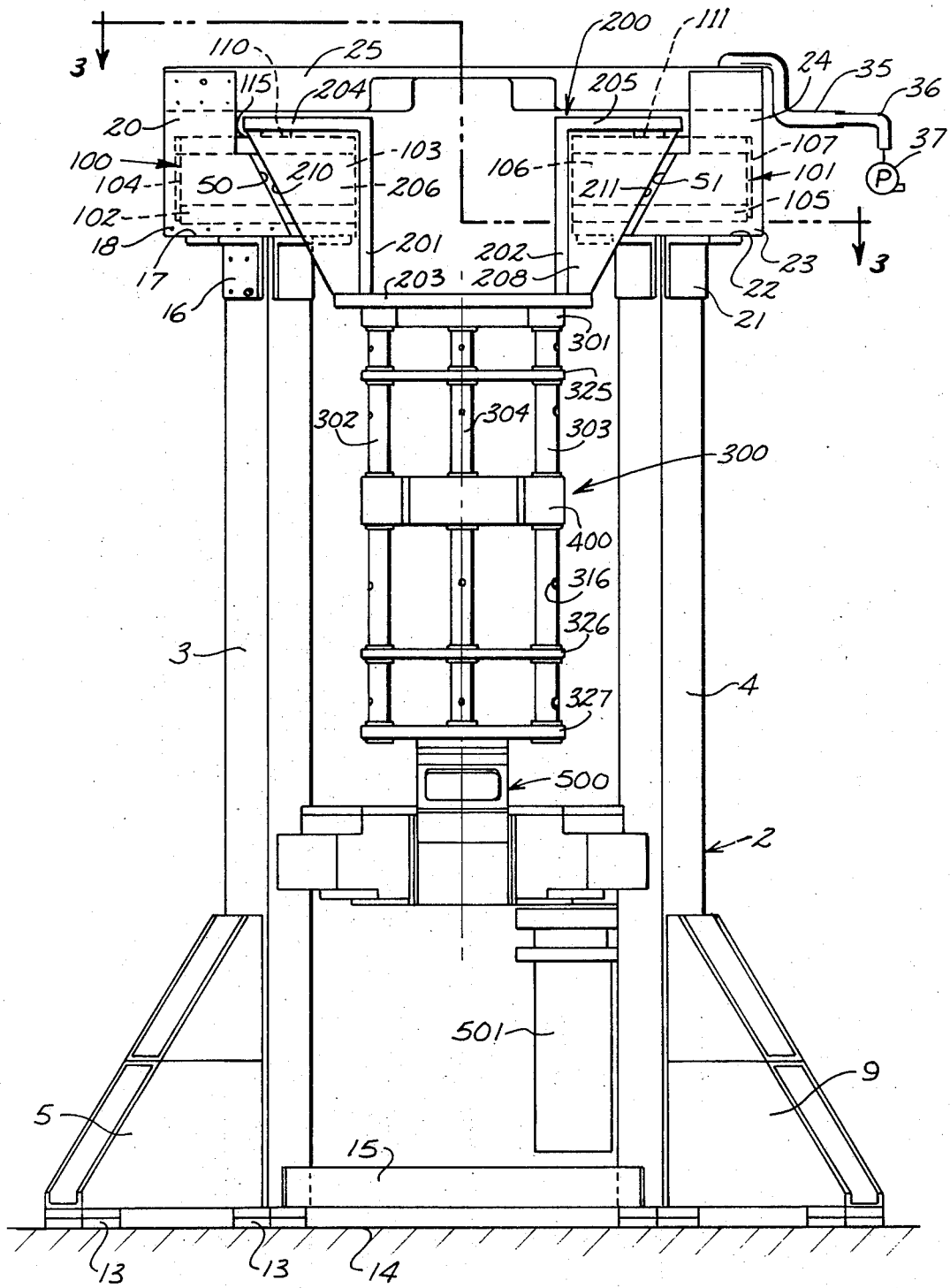
FIG. 2 is a slightly enlarged front elevational view corresponding to FIG. 1 and showing details of the frame and column shelf assembly.
Figure 3:
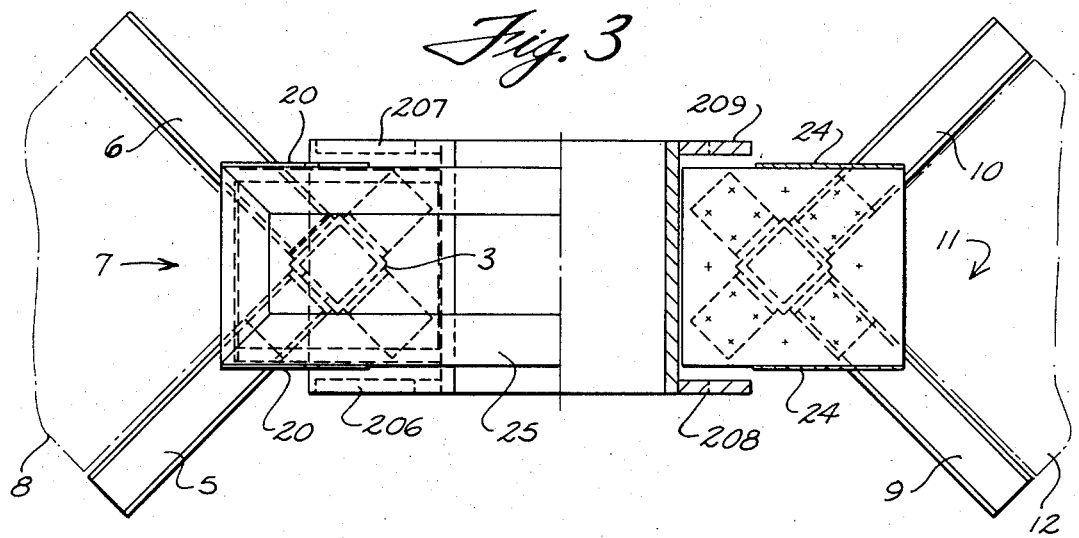
FIG. 3 is a horizontal view in section taken along line 3—3 of FIG. 2.

Referring now to the drawings in detail and particularly to FIGS. 1—3 there is shown the electron microscope 1 of this invention. Microscope 1 has a supporting frame or base 2 including a pair of parallel upright legs 3 and 4. Secured to leg 3 adjacent its lower end are feet 5 and 6 (FIG. 3). As shown at FIG. 2, each of the feet 5 and 6 is generally triangular as viewed in elevation to provide for additional strength and rigidity. Leg 3 is a box shaped as viewed in plan and feet 5 and 6 abut and are secured to the outwardly facing sides of leg 3. It is apparent with reference to FIG. 3 that feet 5 and 6 extend outwardly from the leg 3 at right angles to each other to form a space 7 for a rectuangular or square cabinet 8 to house some of the electronic circuitry used with the microscope of this invention. Leg 4 is similarly provided with supporting feet 9 and 10 which form a convenient space 11 to receive a rectangular or square cabinet 12.

To eliminate the transmission of some shock and vibration from external sources to the frame 2, a vibration isolating pad assembly 13 is positioned beneath each of legs 3 and 4. Similarly, isolating pad assemblies 14 of known construction are positioned under the ends of each of the feet 5, 6, 9 and 10. Pads 13 support the base on floor 14 of the site where the microscope is installed. Additional rigidity is obtained for the lower portion of the base by a connector bar 15 which joins uprights 3 and 4 near floor 14.

Mounted at the upper end of each of legs 3 and 4 are four L-shaped brackets 16 having upwardly facing surfaces 17 which lie in a common horizontal plane. Mounted on surfaces 17 is a bearing support plate 18 which is secured to brackets 16 by suitable bolts (not shown). Secured to the front and back of bearing support plate 18 are upright connector plates 20 which are generally parallel to each other. Mounted on the upper end of leg 4 are four L-shaped brackets 21 having top surfaces 22 in the same plane as the top surfaces 17 of brackets 16. Mounted on surface 22 is a bearing support plate 23. Extending upwardly from the front and back of bearing support plate 23 are parallel connector plates 24. Plates 20 and 24 are joined to each other by a box shaped frame 25 which functions to further rigidify frame 2.

Mounted on bearing support plate 18 is a first bearing assembly 100 and mounted on bearing support plate 23 is a second bearing assembly 101. Bearing assembly 100 is identical to bearing assembly 101 save that the bearing assemblies are mounted in positions rotated 180° relative to each other. Bearing assembly 100 includes a bearing block 102 which supports a journal 103. There is also a thrust plate 104 connected to the outer end of journal 103. Similarly, bearing assembly 101 includes a bearing block 105 which supports a journal 106 and there is a thrust plate 107 connected to the outer end of journal 106. The respective bearing blocks are precisely aligned with each other horizontally.

A yoke 200 is supported by journals 103 and 106, in a manner which will soon be described in detail. Yoke 200 includes a pair of upright side plates 201 and 202 which are parallel to each other and have their lower ends secured to a horizontal bottom plate 203. Top plates 204 and 205 extend outwardly from the upper ends of the respective side plates 201 and 202. The assembly, including side plate 201 and top plate 204, is braced by gusset plates 206 and 207 one in front of and one behind journal 103, and which plates are secured to plates 201, 203, and 204, as shown at FIGS. 2 and 3. Plates 202 and 205 are similarly braced by a pair of gusset plates 208 and 209 which form a rigid structure.

Suspended from yoke 200 is a column assembly 300. Column assembly 300 includes a generally U-shaped connector member 301 which is secured to the bottom of plate 203. Connector member 301 is bored vertically and threaded at three plates to form threaded openings which are essentially equidistantly spaced from each other to receive the upper threaded ends of support 302–304 which are parallel to each other and which are spaced apart in the pattern shown at FIG. 4.

Figure 6:
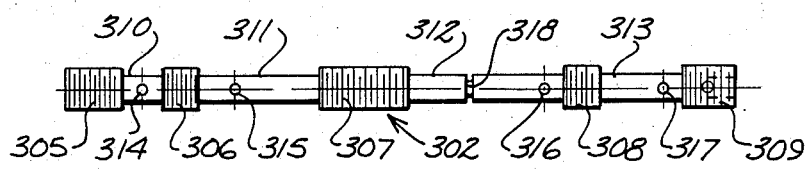
FIG. 6 is a side view of one of the support bars of the column assembly.

The support bars 302–304 are essentially identical to each other, and as shown at FIG. 6 for the support bar 302, each support bar has five threaded sections 305–309. The threaded sections 305–309 are formed on portions of the bar of greater diameter than unthreaded sections 310–313 which extend between the shelves of the column. Formed in the respective unthreaded sections 310–313 are openings 314–317 to receive an appropriate adjusting screw to adjust the positions of the lens assemblies, as will subsequently be described in detail. Openings 310–313 are parallel to each other and perpendicular to the axis of bar 302. Unthreaded section 312 also has an annular groove 318 formed therein to hold the clamp which supports the lower section of the objective lens.

Supported by support bars 302–304 are lens support shelves 325–327. There is also an objective shelf 400 with a specimen chamber formed therein.

FIGS. 7 and 8 show shelf 325, which is representative of the shelves 325–327 of column assembly 300. Shelf 325 is formed from a non-magnetic material such as aluminum and is provided with the substantially equidistantly spaced openings 328–330 to receive the respective support bars 302–304. There is also a larger diameter opening 331 which is counterbored to provide an upwardly facing annular support shoulder 332. Formed in shoulder 332 is a locating pin opening 333 to provide for accurate positioning of an expandable vacuum seal assembly which will subsequently be described in detail. A bore 334 is formed in the shelf, extends from front face 335 of the shelf and communicates with opening 331 at a location offset from a diameter. Bore 334 provides an access opening to insert a suitable tool into the region bounded by opening 331 to manipulate the vacuum seal.

Formed in the top surface 336 of the shelf are three shallow upwardly opening grooves 337–339. Each of the grooves is elongated and the grooves 337 and 339 extend rearwardly beyond opening 331. Seated in the respective grooves 337–339 are bearing bars 340–342. Bearing bars 340–342 have a height slightly greater than the vertical depth of the grooves so the bearings extend above top surface 336 of the shelf and provide bearing faces 343–345 to support a lens assembly. The bearing bars are secured against movement in the grooves by pins 351.

A typical lens assembly 346 is shown in phantom lines at FIGS. 7 and 8. The bottom face 347 of the lens assembly is provided with suitable cylindrical recesses to receive anvils 348–350 which project downwardly below bottom face 347. These anvils are so positioned that with the lens assembly 346 correctly positioned on the shelf, anvil 348 rides on bearing face 343, anvil 349 rides on bearing face 344 and anvil 350 rides on bearing face 345. By virtue of this arrangement, lens assembly 346 can be adjusted to its proper position on shelf 325 by merely sliding the lens assembly on the bearings 340–342. These bearings also simplify removal of a lens from the front of the shelf through the space between openings 328 and 329 (which corresponds to the space bars 302 and 303). While anvils 348–350 provide surface engagement with bearing faces 340–342 respectively, it is apparent that the lens assembly has the equivalent of a three point support on the shelf. While the arrangement for supporting a lens on the shelf 325 has been explained, it is to be understood that the shelves 326 and 327 are essentially the same and that the lenses supported by the shelves 326 and 327 have a similar three point contact with the lens mounted thereon.

Support bars 302–304 have their top threaded sections 305 threaded into the bores of connector member 301. Bars 302–304 are so threaded into connector member 301 that openings 314–317 of each bar extend along a line which intersects the geometric center of the large diameter opening, such as the opening 331, in each shelf. By so orienting the respective spport bars, the placement and alignment of suitable adjusting screws to permit precise positioning of a lens on a shelf is facilitated.

Threaded sections 306 (FIG. 6) of each support bar support the shelf 325. Such support is accomplished by adjusting nuts 355 and 356 which are threaded onto threaded section 306 and are located one above and one below shelf 325, as shown at FIG. 8. Adjusting nut 355 has a chamfered nose 357 and adjusting nut 356 has a chamfered nose 358. The chamfer on the noses 357 and 358 is at the same angle as the angle of the counter sink faces 359 and 360 shown at FIG. 8 for the opening 329. It will also be observed that the threaded portion 306 of support bar 302 is very slightly smaller in diameter than the opening 328 so shelf 325 can be raised and lowered or can be tilted, if desired, by manipulating the adjusting nuts 355 or 356 on each of the rods 302–304. When the shelf is at the desired vertical elevation and angle of tilt, the adjusting nuts 355 and 356 are tightened to secure the shelf in the adjusted position. Shelves 326 and 327 are similar to the shelf 325 and adjustment of these shelves is accomplished in the manner explained for shelf 325 of FIGS. 7 and 8. Of course, shelf 326 is supported by threaded sections 308 of support bars 302–304 and shelf 327 is supported by threaded sections 309 of support bars 302–304, and adjusting nuts 355 and 356 are thread on each threaded section.

Secured to the bottom of shelf 327 is a viewing screen and photography housing assembly 500. If desired, a separate vacuum pump 501 may be connected to housing 500 to maintain the necessary vacuum in the photograph and viewing screen chamber.

THE COLUMN ASSEMBLY

As shown in FIG. 1 column assembly 300 includes yoke 200, shelves 325–327, housing 500, and a power supply 600 mounted on a support plate 601 seated on bottom plate 203 of the yoke assembly. The objective shelf assembly 400 also comprises part of column assembly 300. The objective shelf assembly includes a shelf 401, an upper objective lens assembly 402, mounted on the shelf, and a lower objective lens assembly 403 which is clamped against a bottom face of the shelf by clamp elements 404 below the lower lens section. The clamp elements are supported by the respective support bars 302–304 at the groove 318 formed therein. Bolts 405 extend vertically through clamps 404 and engage a bottom face of the lower lens assembly 403 to hold the section in tight engagement with objective shelf 301.

The objective shelf is different from shelves 325–327 in several ways. As is apparent with reference to FIG. 1, objective shelf 401 is substantially thicker than the shelves 325–327 and shelf 401 also includes a specimen chamber where the specimen to be observed or photographed is placed when the microscope is in operation.

When the microscope of this invention is used as a trans mission type electron microscope, a first condenser lens 602 is mounted on shelf 325. There is a second condenser lens 603 which is seated on and supported by a top surface 406 of upper lens assembly 402. As previously explained, the upper objective lens assembly 402 is mounted on objective shelf 401. Lower objective lens assembly 403 is clamped against the objective shelf 401 by the clamps 404. First and second projector lens assemblies 605 and 606 are supported by shelf 326. Lens assembly 606 mounts directly on the shelf whereas lens assembly 605 is on the top of lens assembly 606. A third projector lens 607 is supported by shelf 327.

The support arrangement for the several lens assemblies is such that there is sufficient space between the top of projector lens assembly 602 and the bottom of plate 203 that lens assembly 602 can be moved forwardly through the space between support bars 302 and 303 to remove this lens assembly from the column. Similarly, there is a space between second projector lens assembly 603 and the bottom of shelf 325. There is also a space between the top of the assembly, including projector lens 605 and 606, and the bottom surface of lower objective lens assembly 403. Similarly, there is a space between the top of third projector lens assembly 607 and the bottom surface of shelf 326. These spaces are sealed in a manner which will subsequently be described in detail, using the remotely energizable seal assembly which forms another feature of this invention.

Figure 9:
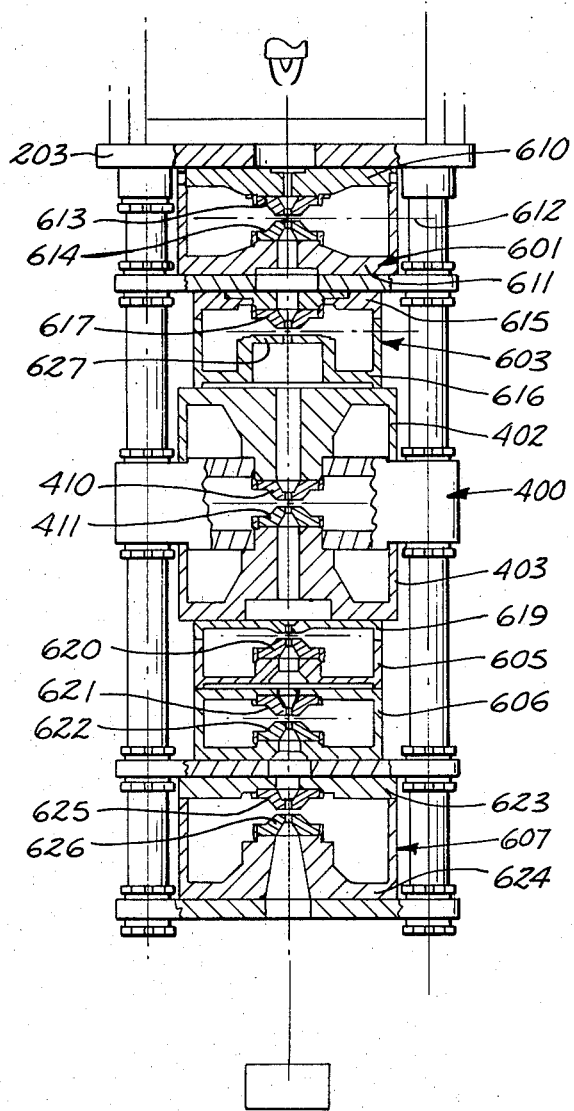
FIG. 9 is a view in vertical section of the column assembly showing the pole pieces and relative alignment of the several lenses, cathode, and viewing screen of the microscope.

FIG. 9 shows the several lenses of lens assembly 600 in section. First condenser lens 601 includes an upper section 610 and a lower section 611. There is the usual air gap designated by a center line 612 which extends through the middle of the gap between the magnetic material pole piece 613 of upper section 610 and the magnetic material pole piece 614 of lower lens section 611. It is to be noted with particularity that pole piece 613 is identical to pole piece 614 and that these pole pieces face toward each other.

Second condenser lens assembly 603 also includes an upper lens sections 615 and a lower lens section 616. Mounted in upper lens section 615 is a pole piece 617 which is identical to pole pieces 613 and 614.

Objective assembly 400, which includes an upper lens assembly 402, and a lower lens assembly 403, as previously explained, has an air gap between the respective pole pieces 410 and 411. The specimen to be observed with the microscope is placed in the air gap between pole pieces 410 and 411 when the microscope is in use. Pole pieces 410 and 411 are identical to each other.

First projector lens assembly 605 has only a single seperable pole piece 620. The second pole piece is formed by the cover 619 of the lens assembly 605. Second projector lens assembly 606 has pole pieces 621 and 622 in its upper and lower sections respectively, which face toward each other and have an air gap therebetween.

Third projector lens assembly 607 includes an upper section 623 and a lower section 624. Upper section 623 supports a pole piece 625 which is spaced vertically from the pole piece 626 supported by lower section 624. All the pole pieces 613, 614, 617, 410, 411, 620, 621, 622, 625 and 626 are identical to each other, and this identical pole piece arrangement substantially decreases the manufacturing cost of the microscope. As is well known, a magnetic microscope lens requires a precisely machined and completely homogeneous pole piece. In some locations of the microscope slight imperfections in the pole piece are permissible, whereas in other lenses of the microscope the pole pieces must be substantially perfect. Since the manufacturer of the microscope usually has little if any control over the quality of the material from which the pole pieces are formed, it was necessary in the past to machine several pole pieces for use in a critical lens of the microscope. Frequently, none of the pole pieces functioned properly and it was necessary to then machine another group of pole pieces for use in one lens. By virtue of the identical pole piece arrangement of the several lenses of the electron microscope of this invention, this problem is obviated in that the pole pieces can be manufactured on a mass production basis, and those with the most precise dimensions and with the most homogeneous material are selected for placement in the most critical lenses of the system. While the pole piece 627 of the lower section 616 of second condenser lens 603 is shown to be of a different configuration than the pole pieces for the remaining lenses, it is to be understood that this pole piece can be made identical to all the other pole pieces of the lens system.

THE OBJECTIVE ASSEMBLY

Figure 5:
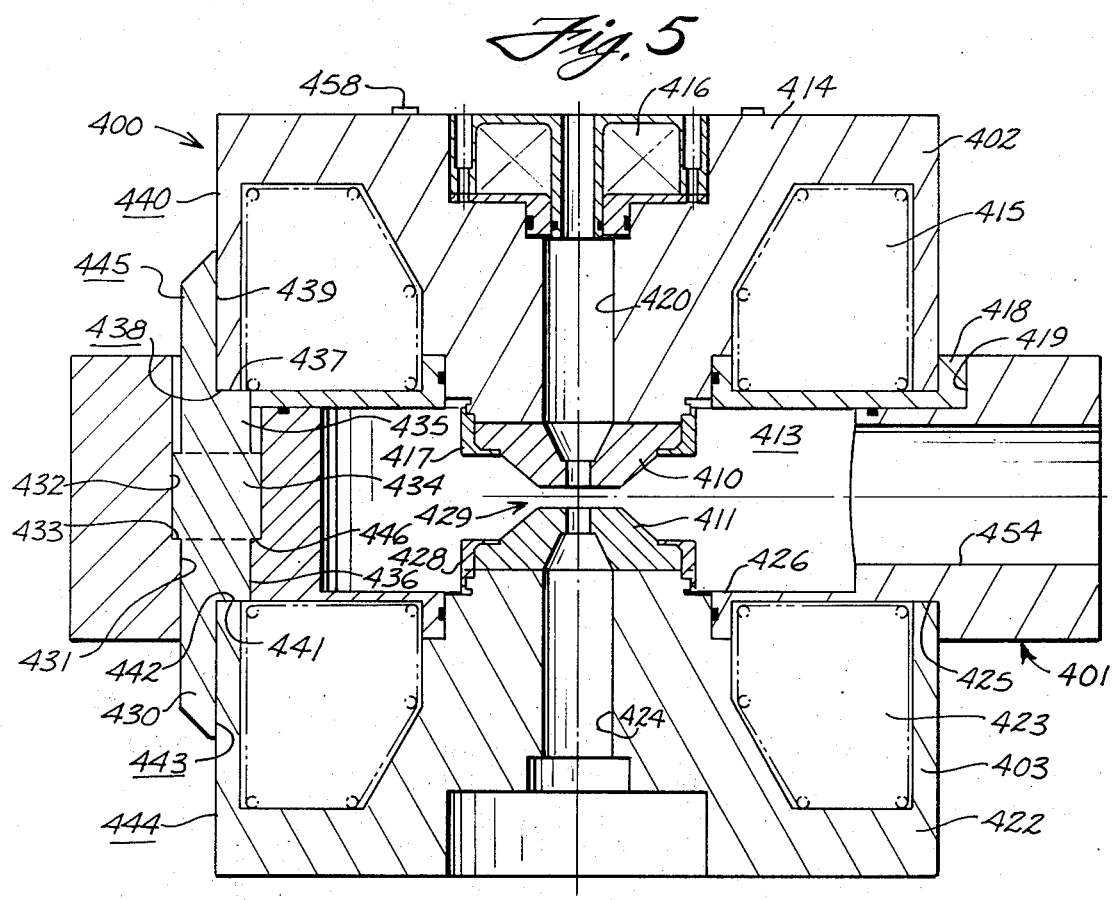
FIG. 5 is a view in vertical section taken along line 5—5 of FIG. 4.
Figure 4:
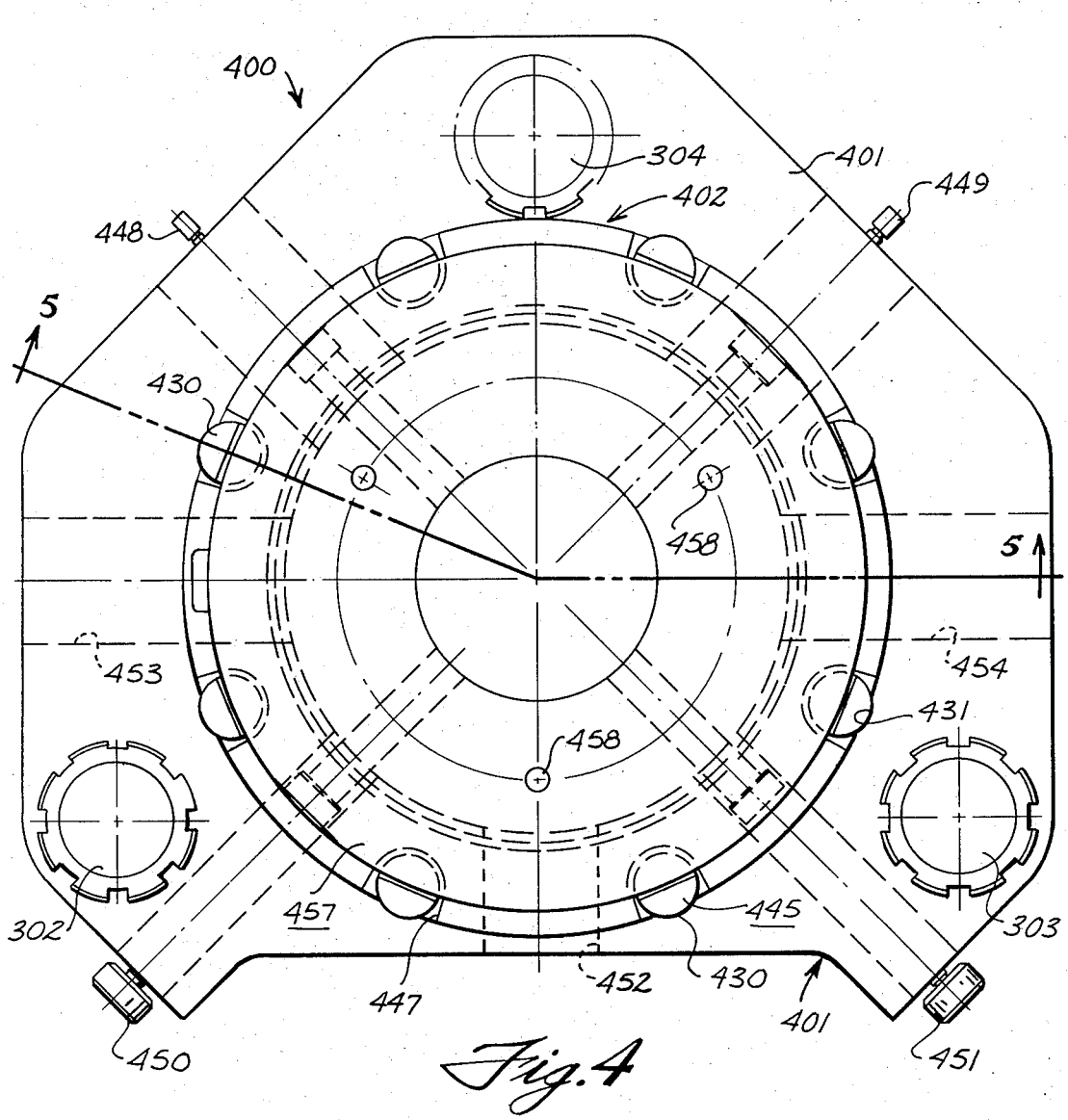
FIG. 4 is a top plan view of the objective lens and shelf assembly.

Objective assembly 400 includes the objective shelf 401 on which upper lens assembly 402 is mounted, and against the bottom of which lower lens assembly 403 is clamped (FIGS. 4 and 5). Shelf 401 is formed from a non-magnetic material such as aluminum, and is sufficiently thick that a specimen cavity 413 of substantial height is within the shelf. Upper lens section 402 includes an upper lens case 414 formed from magnetic material, the case being appropriately recessed to receive a coil 415. In addition, the top of the case is counter-bored to receive a torroidal coil 416. Pole piece 410 is secured to the bottom face of case 414 by a threaded pole piece retaining ring 417. The upper case is seated on a support ring 418 mounted in an upwardly facing recess 419 of shelf 401. Ring 418 and shelf 401 have suitable O-ring seals to seal the specimen chamber and electron beam passage-420 so a high vacuum can be maintained in both the passage as well as the specimen cavity.

There is also a lower case 422 formed from magnetic material and containing coil 423. Lower case 422 has a central passage 424 for the electron beam and abuts against the lower face of an annular groove 425 formed in the bottom of the shelf. Groove 425 defines a ring portion 426 to receive case 422 and seal the bottom of cavity 413. Pole piece 411 is secured to the upper face of case 422 by a retaining ring 428.

In order to provide the necessary magnetic strength in the gap 429 between pole pieces 410 and 411, it is necessary to magnetically connect upper case 414 to lower case 422. This magnetic connection is accomplished using a plurality of magnetic rods or straps 430 which extend perpendicularly through shelf 401 in circumferentially spaced relation to each other and are outside the specimen cavity 413 in which vacuum is maintained during operation of the microscope. As shown at FIG. 4, there are eight bars or straps 430 which are equidistantly spaced from each other circumferentially and are each the same distance from the center of the lens assembly.

As shown at FIGS. 4 and 5, eight cylindrical openings 431 are bored in shelf 401. The openings each have a counter bore 432 which provides an upwardly facing transverse annular shoulder 433. Magnetic strap members 430 have an enlarged cylindrical central body portion 434 and reduced diameter intermediate portions 435 and 436 which extend from the opposite ends of the body portion. Approximately half of intermediate portion 435 is cut away to provide an upwardly facing shoulder 437 against which the bottom face 438 of the top case 414 abuts, and to provide an inwardly facing surface 439 which engages the outside surface 440 of case 414.

Similarly, bottom intermediate portion 436 is cut away to provide a downwardly facing shoulder 441 that engages the upper end face 442 of lower case 422. There is also inwardly facing surface 443 which engages the outer surface 444 of lower case 422.

As shown at FIG. 4, each magnetic strap member is cylindrical in outline including the outside surfaces 445 of those portions of the members which engage outer surface 440 and outer surface 444 of the upper and lower cases respectively. The extent to which each member 430 can be inserted in the opening 431 is limited by the engagement of downwardly facing annular shoulder 446 of the member 430 with the upwardly facing shoulder 433 of opening 432. To accommodate the upper intermediate portion 435 of members 430, ring 418 is provided with eight approximately semi-circular cutouts 447 so shoulder 437 can firmly abut bottom face 438 of upper case 414.

As previously explained, when the microscope is assembled, shelf 401 is supported by support bars 302–304 and lower lens assembly 403 is clamped tightly against the bottom of the shelf by the clamps 404 and screws 405 (FIG. 1). Groove 425 and lower casing 422 are precisely machined with the result that positioning lower case 422 in the groove precisely aligns the lower lens assembly relative to the axis of the column. On the other hand, ring 418, which supports upper case 414, is intentionally made slightly smaller than the diameter of recess 419. By virtue of the clearance between ring 418 and recess 419, the ring and upper lens assembly 402 can be moved slightly to precisely position the upper lens assembly so beam passages 420 and 424 of the respective upper and lower lens assemblies are correctly aligned. Such adjustment is accomplished by adjusting screws 448 and 449 at the rear of shelf 401 and adjusting screws 450 and 451 at the front of the shelf. It will be observed with reference to FIG. 4, that the axis of adjusting screw 448 is along the same diameter of the lens as adjusting screw 451 and the axis of adjusting screw 449 is along the same diameter of the lens as adjusting screw 450, and these diameters are perpendicular to each other. By manipulating the adjusting screws 448–451 which engage the outside of the ring, ring 418, and correspondingly, upper lens assembly 402 supported by the ring can be precisely adjusted to correctly position the upper lens assembly transversely of shelf 401.

There are several relatively large diameter cylindrical openings formed in shelf 401 which communicate with specimen chamber 413. First, there is a horizontal bore 452 which opens through the front of the shelf and provides an opening through which the specimen can be placed in the gap 429 between pole pieces 410 and 411. In addition, there are a pair of bores 453 and 454 which extend horizontally from and open through opposite sides of the shelf and have their axes aligned. The bores 453 and 454 provide openings through which suitable linkages can be inserted into the specimen chamber to move a specimen holder (not shown) in gap 429 and on which the specimen is placed in two horizontal directions at right angles to each other as is well known in the art. The ends of bores 452–454 are of course sealed when the microscope is in use, and the seal arrangement includes the necessary seal elements to seal the various linkages which extend through the several openings. The usual air lock (not shown) will also be used in conjunction with opening 452 to permit inserting specimens while the microscope is in operation, without any significant loss of vacuum. Mounted on top wall 457 of upper casing 414 are three anvils 458 which are equidistantly spaced circumferentially of each other. Anvils 458 project above the surface of wall 57 and provide for three point bearing suspension of condensor lens 603 which is seated on the top of upper objective lens assembly 402.

THE GAS BEARING SUPPORT

As previously explained with reference to FIG. 2, yoke 200 is mounted on bearing assemblies 100 and 101. Side edges 50 of connector plates 20 are cut at an angle and side edges 51 of connector plates 24 are similarly cut at an angle. The side edges 210 of gusset plates 206 and 207 are cut at the same angle and are spaced from the side edges 50. Similarly, the side edges 211 of gusset plates 208 and 209 are cut at the same angle as edges 51 and are spaced from these edges. This arrangement provides for swinging movement of column assembly 300 in a fore and aft direction about the axis of bearing assemblies 100 and 101 without interference. As shown at FIG. 2, yoke 200 is supported at one side on journal 103 by a vibration isolating pad 110 disposed between the top surface 115 of journal 103 and the bottom surface of top plate 204 of the yoke. Similarly, the other side of yoke 200 is supported on journal 106 by a vibration isolating pad 111 between the top of journal 106 and the bottom of top plate 205.

Figure 10:
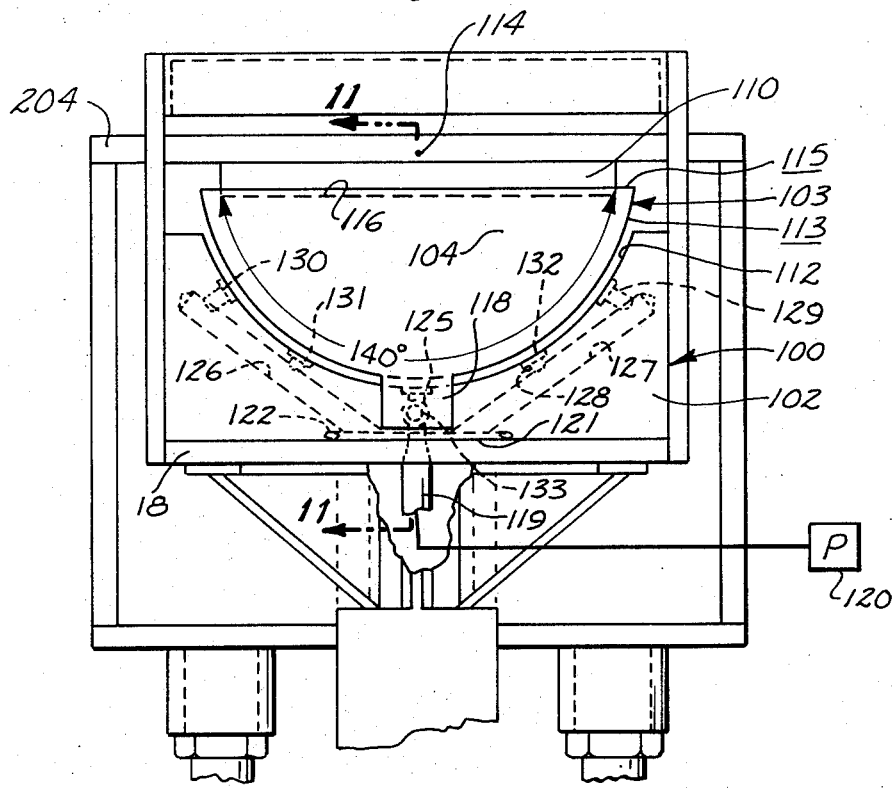
FIG. 10 is an enlarged end view of the bearing assembly at the top of the column of FIG. 2.
Figure 11:
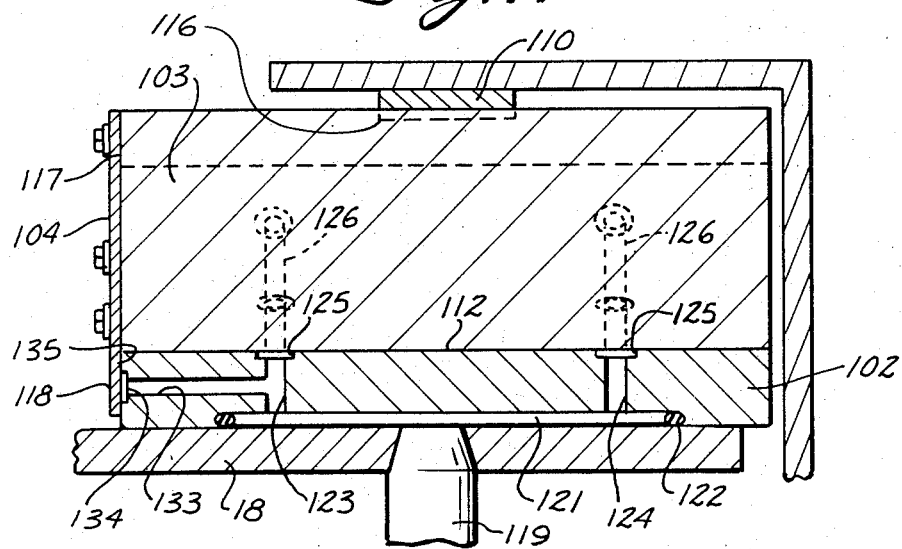
FIG. 11 is a vertical sectional view taken along line 11—11 of FIG. 10.

As shown at FIGS. 10 and 11, bearing assembly 100 includes bearing block 102 in which journal 103 is mounted for rotation on the concave cylindrical bearing surface 112 of the bearing block. The circumferential extent of cylindrical surface 112 is approximately 140°, and as will also be observed with reference to FIG. 10, journal 103, while having a convex cylindrical surface 113, also of cylindrical curvature, extends circumferentially approximately 140°. As shown at FIG. 10, the journal 103 takes the form of a segment of a cylinder. As a result, journal 103 pivots about an axis 114 which is above top surface 115 of the journal. As previously mentioned, vibration isolating pad 110 is disposed between the bottom surface of top plate 204 of the yoke and top surface 115 of journal 103. Pad 110 is fixed to top plate 204. Advantageously, journal 103 is provided with a rectangular recess 116 into which pad 110 fits and which recess prevents the rectangular pad from moving relative to the journal. Connected to the outwardly facing end 117 of journal 103 is the thrust plate 104. Thrust plate 104 is relatively thin and includes a downwardly projecting centrally located shoe 118. The curvature of the sides of the plate is the same as the convex cylindrical curvature of face 103 of the journal.

Bearing block 102 is mounted on bearing support plate 18. Formed in bearing support plate 18 is an opening to receive a pipe 119 connected to a source of pressurized air 120. Pipe 119 communicates with a rectangular manifold 121 formed in the bottom face of bearing block 102 and which manifold is sealed to bearing support plate 18 by an O-ring 122 which is rectangular as viewed in plan. Suitable bolts (not shown) secure bearing block 102 to bearing support plate 18.

Bearing block 102 is provided with vertical bores 123 and 124 which extend from manifold 121 through surface 112 of the bearing. Bores 123 and 124 are each provided with counter bores 125 to provide a larger area at surface 112. In addition, a pair of blind bores 126 and 127 communicate with manifold 121 and there are two pairs of such bores, each spaced approximately one-fourth the length of the bearing block from the respective ends of the block. Bores 126 and 127 extend from manifold 121 at an acute angle and within the block. Ports 128 and 129 communicate with each of the bores 127 and ports 130 and 131 communicate with each of the bores 126. Ports 128–131 each have counter-bored ends 132 at surface 112 of the bearing and open through this surface. In addition, there is a horizontal bore 133 which intersects bore 123 and opens through end face 117 of bearing block 102. The end of bore 133 is provided with a counter bore 134 located at the vertical center of end face 117 at a location below bearing surface 112 so counterbore 134 is opposite shoe 118 of thrust bearing 104.

In operation of the bearing, air under pressure is forced through line 119 from pressure source 120. The air flows through manifold 121 and through each of bores 123, 126, and 127. The air is then directed through ports 123 and 124, as well as ports 128–131 to provide an air film which lifts journal 103, as well as the yoke and column assembly 300, so journal 103 is supported on or floats on a film of air. (Bearing assembly 101, at the opposite side of the column, is similarly constructed so journal 106 also floats on a film of air.) The sole connection between journal 103 of bearing assembly 100 and yoke 200 is the vibration isolating pad 110, and the sole connection between journal 106 of bearing assembly 101 is the vibration isolating pad 111.

When air is supplied to manifold 121 to lift the journal and the column assembly, air is also forced through bore 133 against the inside face 135 of thrust shoe 118. This exerts a force on the journal and column assembly tending to move the column to the left as shown at FIGS. 2 and 11. However, bearing assembly 101 is identical to bearing assembly 100 and thrust plate 107 of bearing assembly 101 is provided with a similar thrust shoe against which air is directed when the bearings are pressurized. Since bearing assembly 101 is identical to bearing assembly 100, save that bearing assembly 101 is turned 180° about a vertical axis relative to bearing assembly 100, the force exerted on the thrust shoe of thrust plate 107 is to the right and hence, these forces oppose and cancel each other to maintain the column assembly in a balanced position along the axis of the aligned bearings. The distance between the inside faces of the thrust shoes of thrust plates 104 and 107 is only several thousandths of an inch greater than the distance between the outer end faces of bearing blocks 102 and 105. The slight clearance thereby provided coupled with the air directed at the thrust shoes maintains the thrust shoes in slightly spaced relation from the end faces of the bearings whenever air is admitted to the bearing blocks. Since the journals which support the yoke essentially float on a film of air, the bearing system is essentially frictionless. By virtue of the substantially friction free bearing support, forces as a result of vibration and external shock on the frame 2 are not transmitted to column assembly 300, but instead, are transformed into a slight swinging of the column assembly, which readily occurs because of the frictionless support for the journals 103 and 106. It has been found that even vibrations parallel to the axis of the journals 103 and 106 are absorbed by the arrangement of thrust plates 104 and 107. Of course, suitable stops are provided to limit the extent of swinging motion of column assembly 300 as a result of shock or vibration, and these stops are placed so that the column can only swing fore and aft a distance equal to one or two inches. Of further significance is the fact that all the elements of the column are rigidly connected together, and when the column swings, all parts swing simultaneously so the axial alignment of the various elements remains precisely the same and there is no change in the direction of the electron beam relative to any of the parts of the column. Were it not for the unique bearing arrangement of the microscope, vibrations could be transmitted to the small delicate cathode which is the source of the electrons for the electron beam, and any vibration of the cathode would change the path of the beam relative to the remaining parts of the column. Such slight change of the electron beam can be extremely annoying and provide inaccurate photographs or views of the specimen, should the beam be vibrated during the time that an exposure is made.

Figure 12:
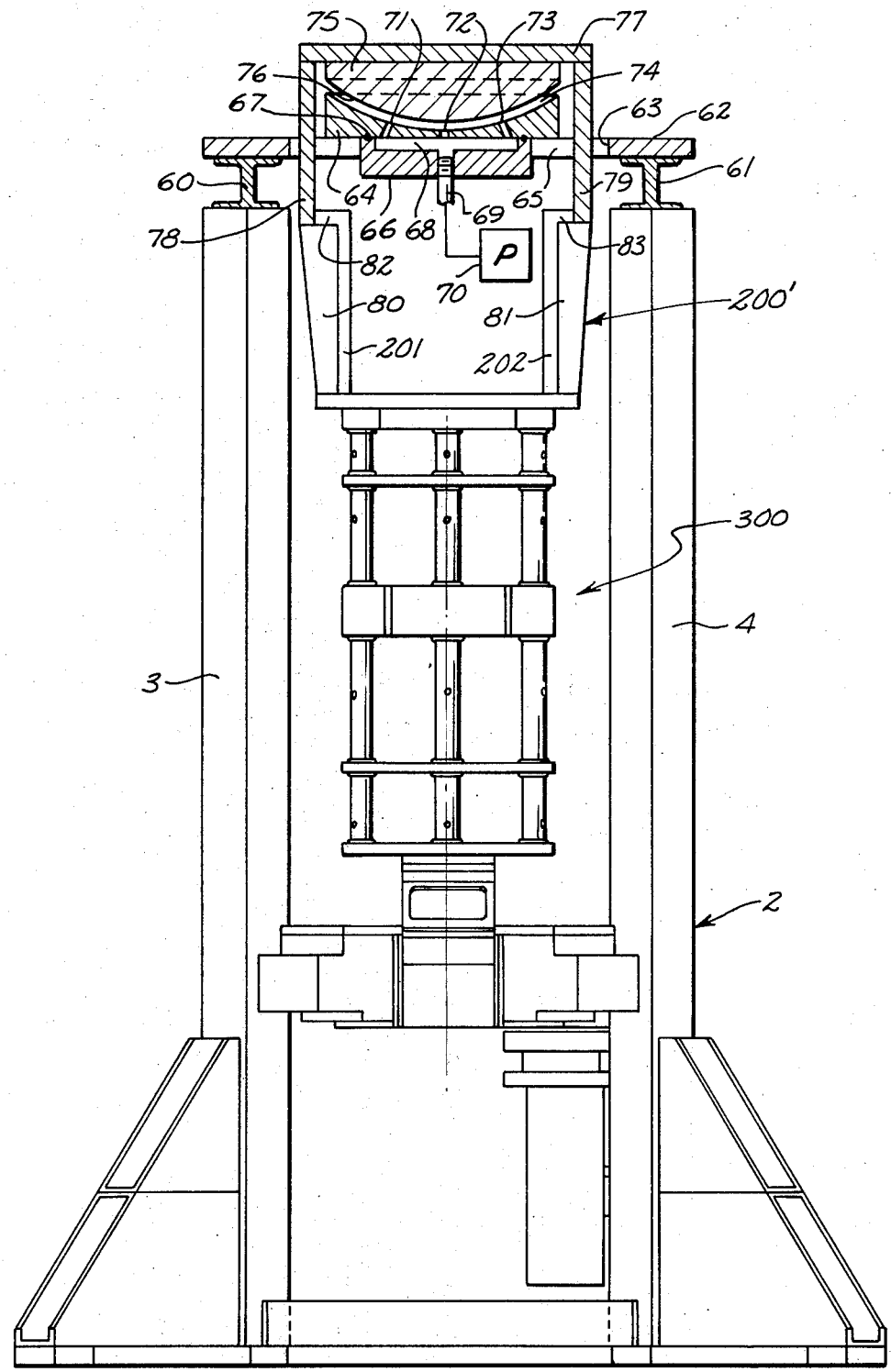
FIG. 12 is a front elevational view corresponding to FIG. 2, but with portions of the upper portion of the column shown in section to illustrate another embodiment of a bearing.

FIG. 12 shows a second embodiment of a gas bearing suspension system in accordance with this invention. The essential difference between the suspension arrangement shown at FIG. 12 and that shown at FIG. 2, 10 and 11 is that the bearing of the FIG. 12 arrangement is spherical rather than cylindrical, the journal which rides on the bearing and which supports the column is also spherical, and there is only one bearing and one journal. As shown at FIG. 12, there are upright supports 3 and 4 with an I-beam 60 secured to the top of upright 3 and an I-beam 61 secured to the top of upright 4. Each I-beam is horizontally elongated and a bearing support plate 62 extends across and is supported by the I-beam. Bearing support plate 62 is rectangular and has a rectangular opening 63 of substantial size formed therein. Extending across rectangular opening 63 is a bearing block 64 which is supported on and secured to the front and rear arms 65 of support plate 62. Secured to the bottom of bearing block 64 within opening 63 is a manifold plate 66 which is sealed to the bottom of the bearing block by an O-ring 67. Formed in manifold plate 66 is a manifold 68 which communicates with a pipe 69 connected to an air pressure source 70. Extending through bearing block 64 are a plurality of ports 71-73 which open through concave spherical surface 74 of the bearing block. Ports 71-73 have their axes directed toward the center of curvature of bearing surface 74 and hence, are perpendicular to this surface.

A journal 75, with a downwardly facing convex spherical surface 76, rides on spherical surface 74 of bearing block 64. Extending across and secured to the top surface of journal 75 is an inverted U-shaped connected member 77 having downwardly projecting legs 78 and 79 which are sufficiently narrow to extend through rectangular opening 64 in bearing support plate 62. The lower ends of legs 78 and 79 are connected to side plates 201 and 202 of a yoke assembly 200' via reinforcing gusset plates 80 and 81 and short top plates 82 and 83. It is to be noticed with particularity that the space between plates 201 and 202 is sufficient to accommodate the power supply 600 in the manner shown at FIG. 1.

When air under pressure from source 70 is forced into manifold 68, the air flows through ports 71-73 (it is to be understood that only several of these ports are shown and that others may be provided in equally spaced apart circumferential relation to each other), and the air lifts journal 76 and the column assembly connected to the journal so journal 75 floats on a film of air in the manner previously described for the bearing assemblies 100 and 101. Because the concave surface 74 of bearing block 64 is spherical and because the convex surface 76 of journal 75 is also spherical, the thrust bearings used with the cylindrical bearings assemblies 100 and 101 are not required. With the bearing support arrangement of FIG. 12, shock and vibration transmitted to frame 2 and bearing 64 is transformed into a swinging motion of column assembly 300 regardless of the direction of the shock and hence, such shock and vibration is effectively attenuated and does not affect any of the elements supported by the column. The absence of vibration transmission to the column provides advantages the same as those described for the bearing assemblies 100 and 101.

THE POWER SUPPLY AND ELECTRON GUN

Figure 13:
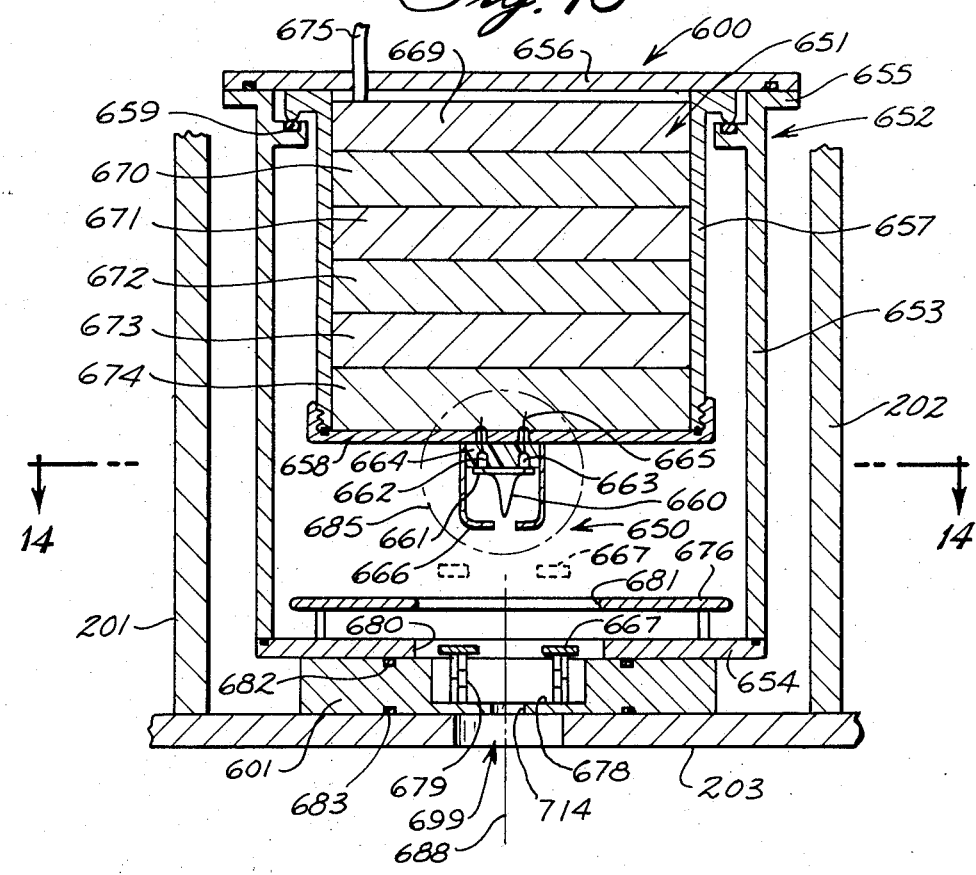
FIG. 13 is a vertical sectional view through the power supply and yoke of FIG. 1.

As shown at FIG. 1, power supply 600 is mounted on a plate 601 supported by bottom plate 203 of yoke 200. With reference to FIG. 13, the power supply and electron gun are shown in more detail. Electron gun 650 and high voltage power supply 651 are mounted in a casing 652. Casing 652 has a cylindrical side wall 653 secured to a bottom wall 654 and sealed thereto. The upper end of side wall 653 has an inwardly extending flange 655 spaced below a cover 656 seated on and removably secured and sealed to the top end of side wall 653. Supported on flange 655 is an inner casing 657 concentric with side wall 653. Casing 657 is removably sealed to flange 655 by a seal 659, and has a bottom wall 658 which closes and isolates the interior of casing 657 from the inside of casing 652. The inner casing is held against seal 659 by cover 656.

Cathode 660 is mounted on a support plate 661 having upwardly extending plug prongs 662 and 663. Prongs 662 and 663 mate with socket forming openings formed in insulating support 664 secured to bottom wall 658 of casing 657. Wires 665 pass through openings in wall 658 and the openings are sealed so the interior of inner casing 657 is hermetically sealed relative to the interior of casing 652. Cathode shield 666 is removably secured to support 664. Wires 665 are connected to a low voltage power supply in casing 657 which is magnetically energized by the high voltage supply. Advantageously, inner casing 657 is filled with an insulating gas maintained at a pressure slightly above atmospheric to insulate the high voltage power supply.

High voltage power supply assembly 651 is comprised of a plurality of decks 669–674 in stacked relation to each other. Top primary deck 669 receives power from a cable 675 which extends through an opening in cover 656 which is sealed so pressurized insulating gas can be maintained in casing 652. The voltage supplied by cable 675 is from the usually available 220 volt supply. Decks 670–674 are secondary decks magnetically coupled in transformer fashion to primary deck 669. The outputs of the several decks are connected in series so the total output voltage of the high voltage supply is the sum of the voltages of the individual decks. Depending on the number of decks used, voltages in the range of 25 to 300 Kv can be obtained. A signficiant advantage of the relatively small gas insulated power supply 600 mounted on the top of the column is the absence of the usual oil insulated high voltage power supply used with electron microscopes in the past, and which frequently obstructed the rear of the microscope. In addition, the heavy bulky cables used in the past to connect the electron gun to the high voltage power supply are also eliminated. Since the power supply 651 is located in the same casing 652 as pickup electrode ring 676 and anode 677, and is in close proximity to the pickup electrode and anode, the necessary high voltage electrical connections are vastly simplified.

Support plate 601 has a centrally located recess 678 in which mechanism 679 to adjust the vertical position of anode 677 is located.

In its lowered position, anode 677 is within the confines of opening 680 of bottom plate 654. Anode plate 677 is movable upwardly a substantial distance so it can be positioned closely adjacent cathode cup 666, if desired, as shown in phantom lines at FIG. 13, As is apparent, anode 677 can be moved through the opening 681 in pickup electrode ring 676. Formed in the top surface of plate 601 is an annular O-ring groove provided with an O-ring seal 682 which prevents loss of vacuum between plate 601 and bottom wall 654. There is a similar seal 683 between plate 203 and plate 601.

Figure 14:
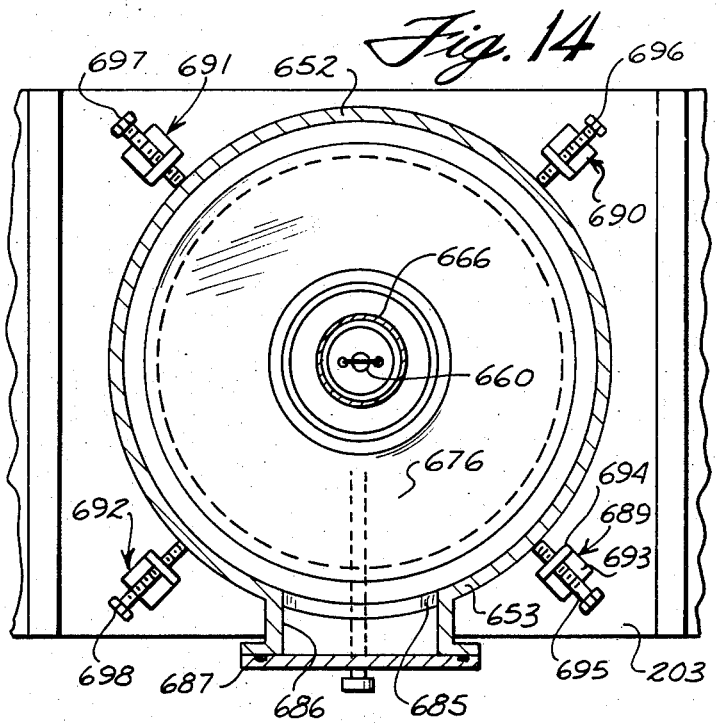
FIG. 14 is a vertical sectional view taken along line 14—14 of FIG. 13.

With reference to FIGS. 13 and 14, cathode 660 can readily be removed via an access opening 685 in side wall 653 of casing 652. The access opening 685 (shown in phantom lines at FIG. 13) is cylindrical and is defined by a sleeve 686 sealed to side wall 653 and which opens forwardly and has its front end closed by a cover plate 687. The circular opening 685 is located approximately at the horizontal level of cathode 660 so it is merely necessary to remove cover plate 687, reach into casing 652, remove cathode cup 666 and then unplug cathode 660, whereupon it can be readily withdrawn through opening 685. By virtue of the plug arrangement, incuding plug prongs 662 and 663, a new cathode can be readily inserted into the socket in support 664 and will occupy substantially the same position as the old cathode which was removed. Hence, little if any additional alignment is required after a cathode is replaced.

As previously explained, cathode 660 is rigidly supported within casing 652. In order to adjust the cathode relative to the center line 688, of, for example, the objective lens assembly, the entire casing 652 including power supply 651 and cathode 660 are moved relative to plate 601 which is fixed to plate 203. Such movement is accurately accomplished by the power supply-cathode adjusting assemblies 689–692 each of which includes and L-shaped support with a horizontal leg 693 secured to yoke plate 203 and an upstanding leg 694 with a threaded opening therein in which the respective screws 695–698 are threaded. The ends of screws 695–698 abut the sides of casing 652 at a location slightly above bottom wall 654, and as shown at FIG. 14, adjusting screws 696 and 698 are diametrically opposed relative to casing 652, whereas screws 695 and 697 are similarly diametrically opposed, but lie on a diameter at right angles to the diameter along which the axes of bolts 696 and 698 extend. Manipulating appropriate ones of screws 695–698 moves casing 652 in two directions at right angles to each other so cathode 660 can be placed at any desired position relative to axis 687 of the objective lens and column assembly, and can be secured in the adjusted position by the screws. By virtue of the seal 682, and the absence of a positive connection between plate 601 and casing 652, the position of the casing 652 and correspondingly, the position of cathode 660 can be changed while a vacuum is maintained in casing 652 and beam passage 699 of the column. The mechanism 679 by which anode 677 is raised and lowered is actuated by manipulating an adjusting rod 700 which extends through plate 601.

The mechanism for adjusting anode 667 is best described with reference to FIGS. 15–17. As shown, adjusting mechanism 679 is located in recess 678 of plate 601. Adjusting rod 700 extends through the plate into the region of recess 678. Adjusting mechanism 679 includes screws 701 and 702 having threads formed in opposite directions threon, so the thread of screw 701 is for example, a right hand thread, whereas the thread for screw 702 is a left hand thread. Screws 701 and 702 are keyed together for simultaneous rotation and each screw is restrained from axial movement. Screw 701 is threadedly received in the internally threaded bore 703 of a carriage 704 and screw 702 is threadedly received in the internally threaded bore 705 of a carriage 706. The other sides of carriages 704 and 706 have plain bores 707 and 708 respectively which slide along a fixed guide bar 709 parallel to the axis of screws 701 and 702. Hence, when knob 710, at the end of shaft 700 is rotated, screws 701 and 702 likewise rotate and carriages 704 and 705 are driven in opposite directions.

A scissors type linkage 711 is driven by carriages 704 and 705. Elongated link 712 has its lower end pinned to carriage 704 and elongated link 713 has its lower end pinned to carriage 705. It will be observed with reference to FIG. 17, that there are links 712 and 713 pivotally pinned or connected to each side of the respective carriages 704 and 705. By virtue of this arrangement, the opening 714 concentric with the center line of column assembly 300 remains open and unobstructed.

Link 712 is pinned to link 713 by a pin 715. In addition, there are short links 716 and 717 having their ends pinned to each other by a pin 718 and their other ends respectively to the links 712 and 713. Extending inwardly from the upper end of link 713 is a roller 719, and extending inwardly from the upper end of link 712 is a roller 720. The rollers ride in a track 721 formed in the sides of a support 722 for anode plate 677. The pin 718 which pivotally joins links 716 and 717 extends inwardly and is connected to support 722. By virtue of the arrangement of the several links of scissors assembly 711, anode plate 677 is raised and lowered precisely along a vertical axis while the plate is maintained precisely horizontal. Since any change at all of the axis of anode plate 677 would correspondingly deflect the electron beam and since any tilting of the anode would correspondingly affect the direction of the electron beam from the cathode 660, the advantages of this scissors mechanism for movably supporting the anode are readily apparent.

THE VIEWING AND PHOTOGRAPHIC CHAMBER ASSEMBLY

Figure 18:
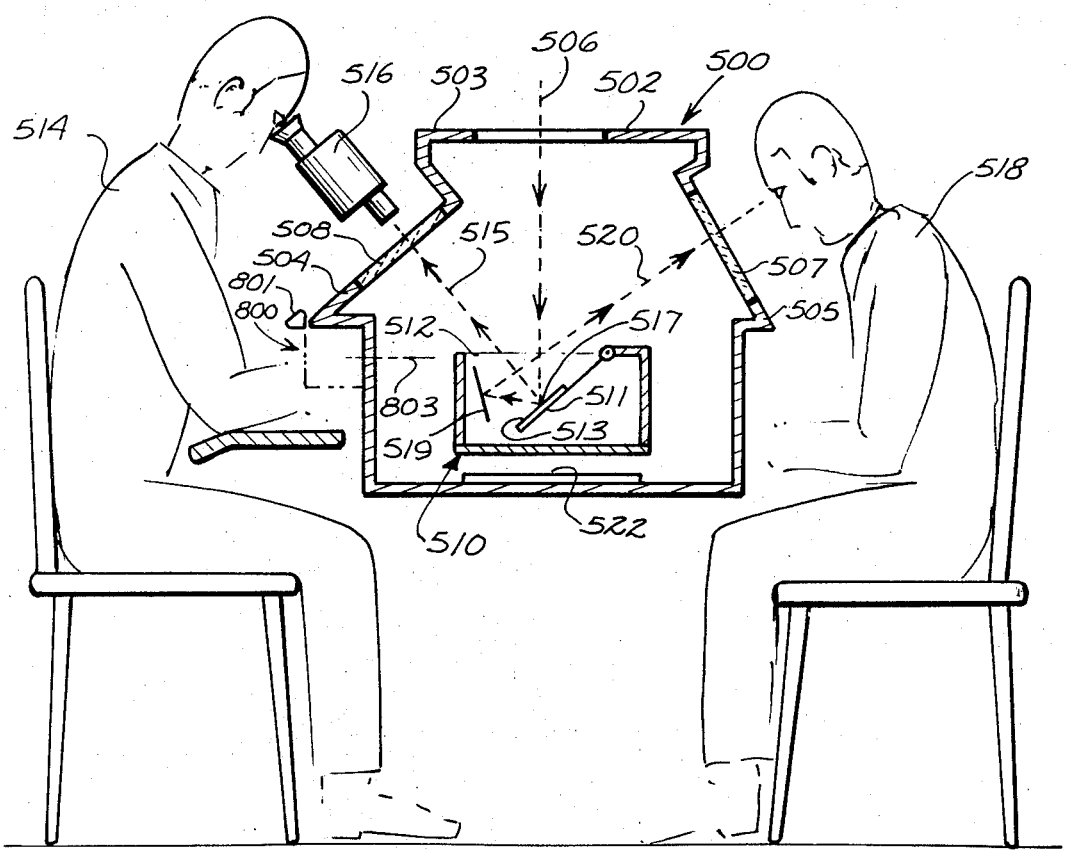
FIG. 18 is a side elevational view in section of the viewing screen and photographic chamber and the positions of a seated operator and a seated observer relative to the chamber.

FIG. 18 shows schematically, the viewing and photographic chamber assembly 500 for the microscope of this invention. As previously explained with reference to FIG. 1, assembly 500 is secured to the bottom of shelf 327. Suitable seals are provided to maintain a vacuum tight seal between top wall 502 of the housing 503 of the assembly so a vacuum can be maintained in the housing, as well as along the electron passageway of the microscope. As shown at FIG. 18, housing 503 has a sloping front wall 504 and a sloping rear wall 505 which are at slightly different angles to the axis 506 of the electron beam path for the microscope. Mounted in rear wall 505 is a rear viewing window 507 and mounted in front wall 504 is a front viewing window 508. Front viewing window 507 extends at an angle of approximately 30° with axis 506, whereas viewing window 508 extends at an angle of approximately 40° with axis 506.

Mounted within housing 502 is a viewing screen assembly 510. Screen assembly 510 includes a swing down viewing screen 511 which can be moved from a horizontal position 512 to the lowered position 511 in which the face 513 of the screen is precisely parallel with the plane of front viewing window 508. By virtue of this arrangement, with screen 511 in its swung down position, operator 514 can view screen 511 along the optical axis of binoculars 516 and this axis is perpendicular to face 513. By virtue of the location of the screen assembly 510, the axis 515 of binoculars 516 is perpendicular to the screen at the point of impingement 517 of an electron beam coincident with axis 506, which represents the precise center of the column. The observer 518 looking through rear window 507 can indirectly view surface 513 of the screen in its swung down position via a mirror 519. The image on surface 513 is transmitted to the observer from the screen, to the mirror, and then through the window 507 as illustrated by the phantom line 520. When it is desired to obtain a photograph of the image projected by the beam, a photographic plate 522 is placed at a location slightly below the bottom of screen assembly 510, as shown.

Of significance is the arrangement of the microscope where both the front and rear of the microscope in the region of the assembly 500 are completely open and unobstructed so operator 514 can sit on chair 523 in a comfortable position and directly view the screen from a location in front of the window 508. In addition, observer 510 can sit on a chair 524 in a very comfortable position in front of rear window 507 and can similarly view the screen 511 both in its swung down position via the mirror 519, as well as directly when the screen 511 is moved to its horizontal position 512.

THE VIEWING SCREEN ASSEMBLY

Figure 19:
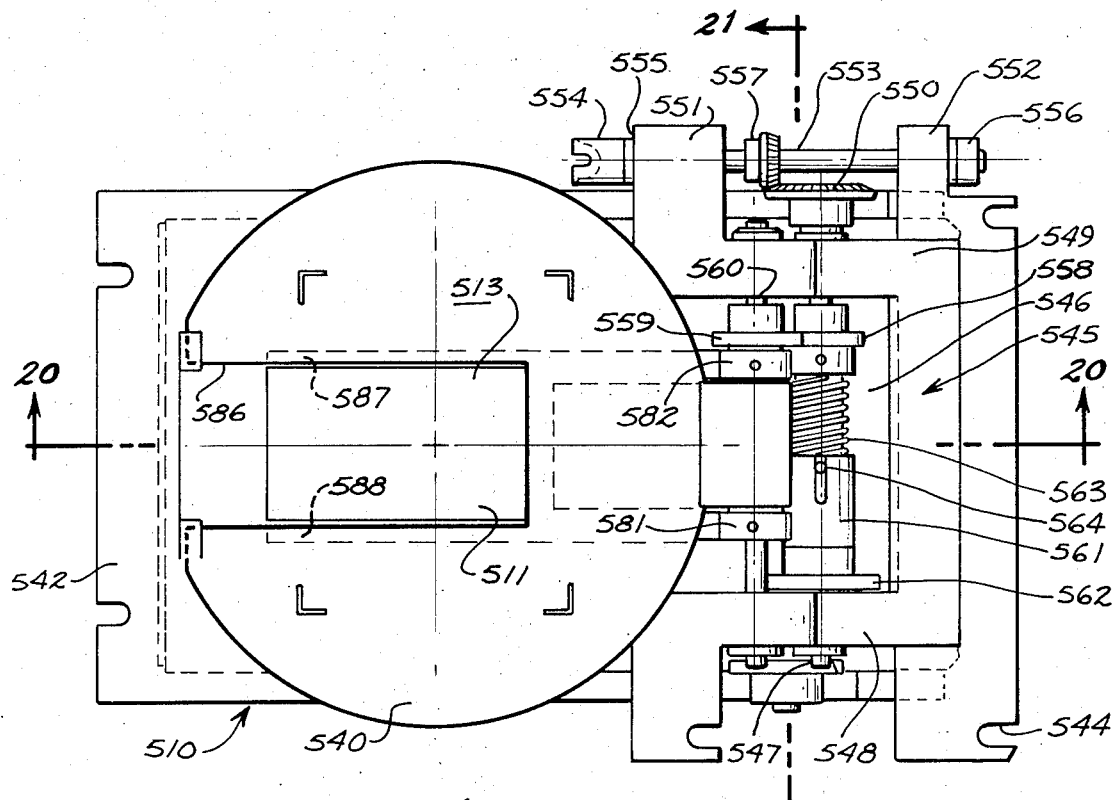
FIG. 19 is a top plan view of a viewing screen assembly in accordance with this invention.
Figure 20:
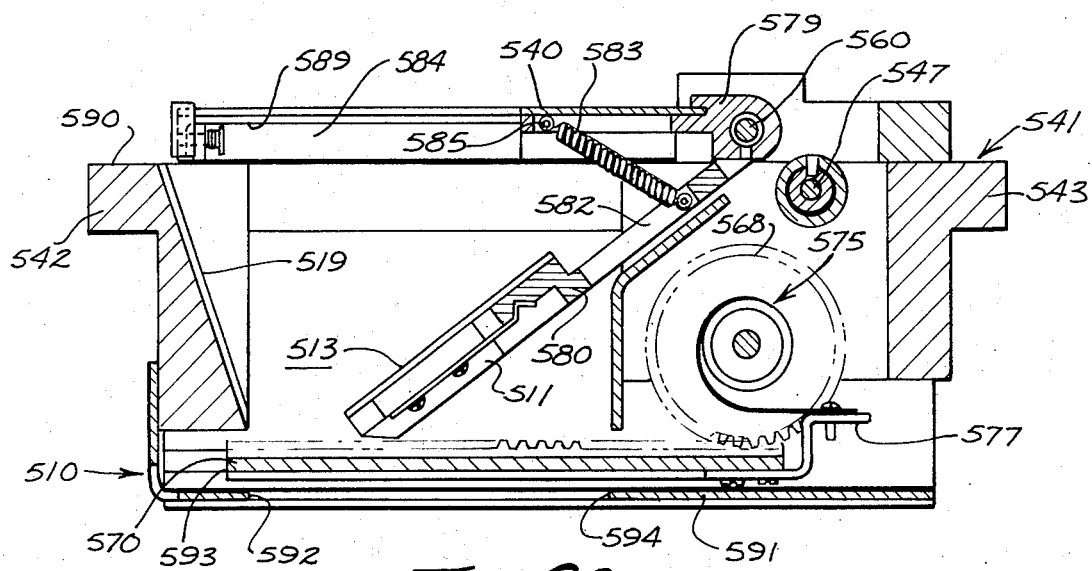
FIG. 20 is a view in section taken along line 20—20 of FIG. 19.
Figure 21:
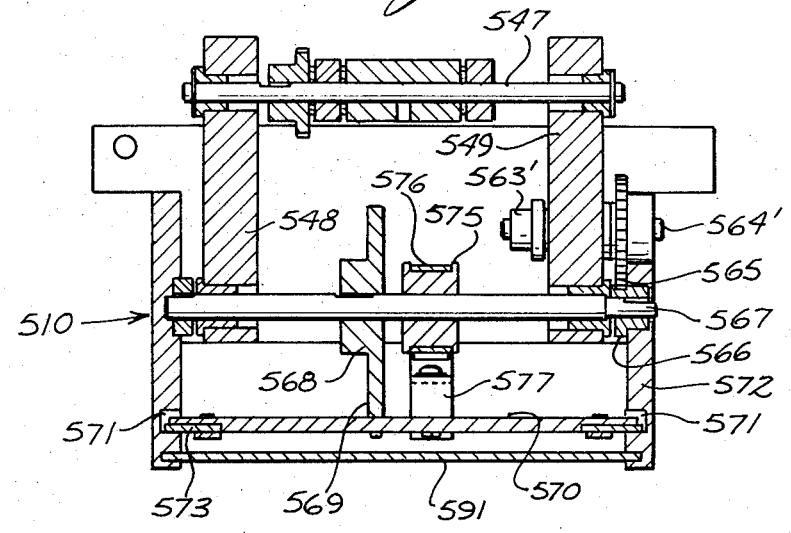
FIG. 21 is a view in section taken along line 21—21 of FIG. 19.
Figure 22:
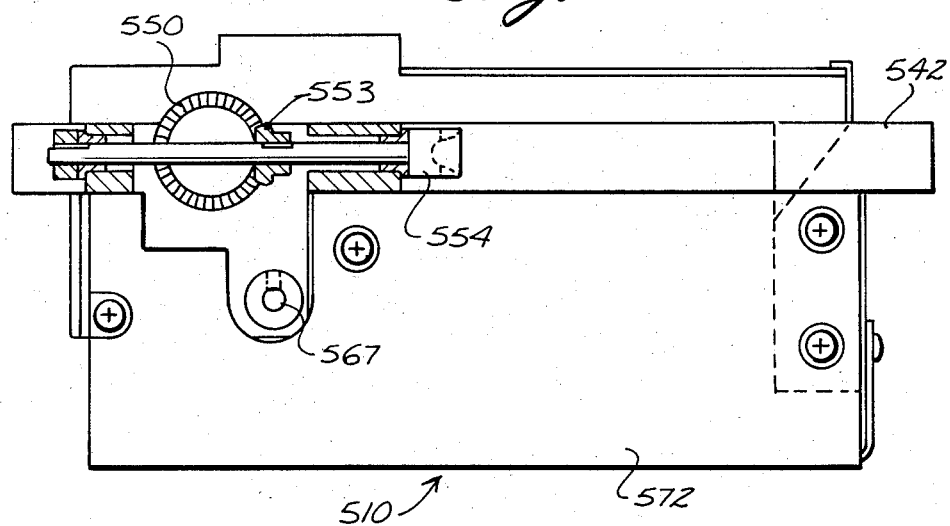
FIG. 22 is a side view in elevation of the screen of FIG. 20 with portions thereof cut away for clarity.

The viewing screen assembly is best described with reference to FIGS. 18–22. FIG. 19 shows the viewing screen with its downwardly movable screen 511 in its horizontal position, whereas FIG. 20 shows the screen 511 in its swung down position. In addition to the portion 511 of the screen, there is also a generally circular portion 540 of the screen which does not swing downwardly with screen 511. Both screens 511 and 540 are however, mounted for pivotal movement on a mounting block 541 having front and back flanges 542 and 543 each provided with suitable screw receiving slots to mount the screen assembly in position in the housing 502. Secured to the top of block 541 is a second generally U-shaped frame 545. Frame 545 has a generally U-shaped recess 546 through which a drive shaft 547 extends. Drive shaft 547 is journaled in the legs 548 and 549 of frame 545 and has a bevel gear 550 keyed to one end.

A pair of legs 551 and 552 project horizontally from frame 545 and are formed with suitable openings to receive a drive shaft 553. At the forward end of drive shaft 553 is a coupling 554 with an enlarged head that engages the front face 555 of leg 551. Coupling 554 is keyed to drive shaft 553. At the other end of shaft 553 is a retainer collar 556 which maintains shaft 553 against endwise movement. Keyed to shaft 553 is a bevel drive gear 557 which meshes with bevel gear 550. Hence, when coupling 554 is rotated, gear 557 rotates and drives gear 550 which rotates shaft 547. Pinned to shaft 547 is a spur gear 558 which meshes with a spur gear 559 pinned to shaft 560. Also mounted on shaft 547 is a collar 561 secured to a second spur gear 562. Collar 561 and gear shaft 562 are rotatable on the shaft. A coil spring 563 and pin 564 provides a lost motion connection between shaft 547 and collar 561. The nature of this lost motion connection is such that rotation of shaft 547 from an initial position does not rotate collar 561 or gear 562 until the shaft has rotated a predetermined amount, for example, 45°.

Spur gear 562 meshes with a spur gear 563' (FIG. 21) keyed to a shaft 564' mounted for rotation in leg 549 of frame 545. Also keyed to shaft 564' is a spur gear 565 in driving engagement with a gear 566 on shaft 567 supported for rotation by legs 548 and 549 of the frame. A larger diameter spur gear 568 is keyed to shaft 567, nd the teeth of gear 568 engage a rack 569 secured to the top face of a gate plate 570 mounted for sliding movement in grooves 571 in a base portion 572 of the screen assembly frame. Suitable bearing plates 573 are connected to the opposite sides of gate plate 570 to facilitate sliding movement of the plate in a manner which will subsequently be described in detail.

Also secured to shaft 567 is a constant tension spring assembly 575 on which an elongated spring band 576 is wound. Band 576 has its free end secured to a connecting bracket 577 which is secured to gate plate 570.

Outer screen 540 is mounted for pivotal movement on shaft 560, whereas screen 511 is keyed to this shaft for movement therewith. In this regard, bearing 579 is pivotally mounted on shaft 560, as shown at FIG. 20. The support 580 for screen portion 511 includes a pair of cylindrical ears 581 through which shaft 560 extends (FIG. 19) and which are pinned to shaft 560 for movement therewith. Support 580 also includes an arm 582 with a recess therein to which one end of a tension spring 583 is secured. Bearing 579 has an annular frame support secured thereto on which portion 540 of the screen is mounted. The other end of spring 583 is secured to frame 584 at a pin connection 585. As shown at FIG. 19, the support 580 for screen portion 511 is generally rectangular and is slightly greater than the width of opening 586 in screen portion 540. By virtue of this arrangement, upwardly facing abutment shoulders 587 and 588 are provided which engage the downwardly facing abutment surfaces 589 on the underside of frame 584, when screen 511 is in the horizontal position shown at FIG. 19. Spring 583 assures that screen portion 540 is maintained in engagement with top surface 590 of housing 541 when screen 511 is in the lowered position of FIG. 20. Spring 583 also assures the surfaces of screen 511 and 540 are in precise horizontal alignment by pulling the lower screen so its abutment surfaces 587 and 588 engage abutment surfaces 589.

The assembly, including screen 511 and 540, is movable to a fully retracted upwardly swung position as shown in phantom lines at FIG. 20. The manner in which the screen is retracted will soon be described. Mounted on an inside angled front face of housing 541 is mirror 519 which provides for viewing of screen 511 (when swung down) by the observer looking through the rear window 507. At the bottom of the screen assembly is a flat plate 591 with a rectangular opening 592 formed therein and which functions as a photographic mask.

The operation of screen assembly 510 is as follows. When coupling 554 is rotated in one direction, namely, counterclockwise, as viewed from its open end, gear 557 drives gear 550 and shaft 547 which in turn drives gear 558 which drives gear 559 to swing screen 511 downwardly to the downwardly angled position shown at FIG. 20. Rotating coupling 554 in the opposite direction similarly rotates shaft 547 to rotate gear 558 and 559 so the screen is moved to a horizontal position in which the surface 513 of the screen is coplaner with the surface of screen 540. Continued rotation of coupling 554 in a clockwise direction rotates screen 511 and screen 540 to a retracted position, as shown at FIG. 20, in which both screens are out of the path of travel of the electron beam. Such simultaneous retracting movement of the screens is accomplished by the engagement of abutment surfaces 587 and 588 with abutment surfaces 589 so screen 540 is lifted upwardly about shaft 547 as screen 580 is moved upwardly.

The function of gate plate 570 is to prevent the electron beam from impinging on photographic plate 522 positioned as shown at FIG. 18, during retraction of the screens and before the camera shutter is closed. It is, however, desirable to maintain gate plate 570 in the position shown at FIG. 20 until screens 511 and 540 have been moved upwardly through an angle of approximately 450. Such initial movement of the screens 511 and 540 without moving gate plate 570 is provided by the lost motion connection including the spring 563 and the pin 564. Hence, collar 561 and gear 562 begin to rotate only after the screens are elevated to an angle of approximately 45° above the horizontal position of FIG. 20. When gear 562 begins to rotate, it drives gear 568 via the gear train including gears 563', 565 and 566. This gear train provides a speed-up drive which then rapidly drives the gear 568 to slide gate plate 570 to a retracted position in which its front edge 593 is at the rear edge 594 of opening 592 in mask 591. As the screen is lowered from the phantom line fully retracted position, the gate plate is returned immediately (without lost motion) by virtue of the action of the constant tension spring assembly 575. The advantage of this arrangement will subsequently be described in detail.

An actuator assembly 800, including an actuator knob 801, is mounted at a convenient location adjacent viewing window 508, as shown at FIG. 18. Actuator 800 operates to rotate the input coupling 554 of screen assembly 510 to move the screens to their several positions from a location outside the viewing chamber 502. The connection between actuating mechanism 800 and coupling 554 is via a shaft 802 which extends through and is sealed to a front wall of the viewing housing and extends along an axis 803 as shown at FIG. 18. Seal rings 804 seal the opening in the housing so shaft 802 can rotate without loss of the vacuum in the housing 502. The coupling between shaft 802 and coupling 554 includes a pin 805 which engages in the slots of the coupling 554.

Figure 23:
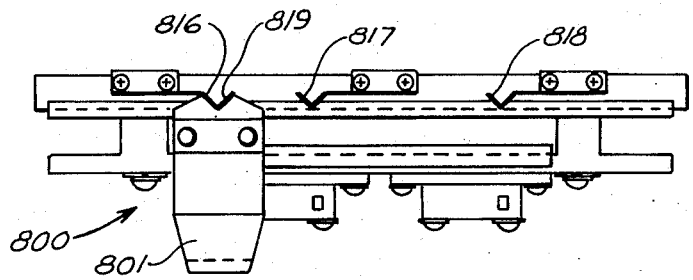
FIG. 23 is a top plan view of a viewing screen actuating mechanism according to this invention.
Figure 24:
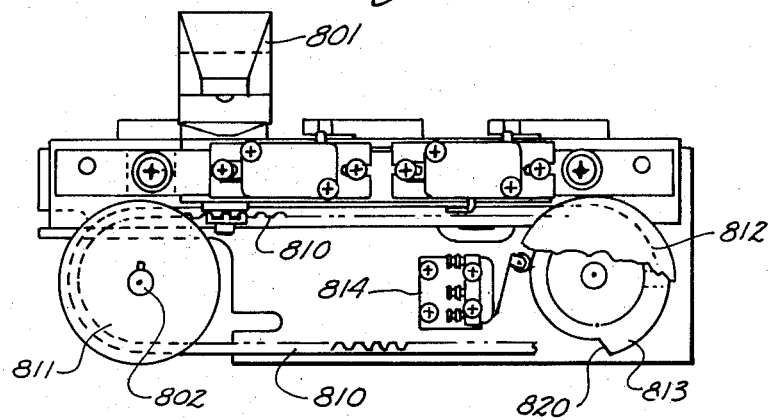
FIG. 24 is a front elevational view of the screen actuating mechanism with portions thereof removed.
Figure 25:
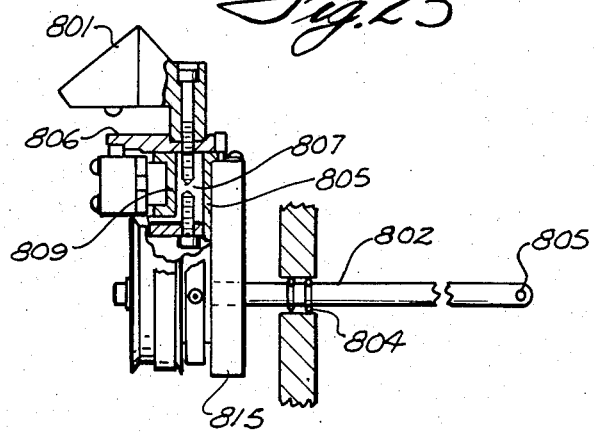
FIG. 25 is a side view in partial section of the actuating mechanism of FIGS. 23 and 24.

Actuating knob 801 is mounted for horizontal sliding movement on a track plate 806. The knob is secured to a slide block 807 which is guided by the plate 808 on one side, and the bar 809 on the other side. Slide block 807 is secured to a toothed endless belt 810 which extends around and drives a first toothed gear 811 at one side of the assembly and a second toothed gear 812 at the other side of the assembly. Keyed to gear 811 is the shaft 802. Gear 812 drives a cam 813 which operates a switch 814. Mounted on the top of a support plate 815 at the rear of the assembly are three V-shaped springs 816–818. Operating knob 801 is provided with a rearwardly facing V-shaped notch 819 which, when engaged by one of springs 816–818 so locates knob 801 and so rotationally positions drive shaft 802 that screen assembly 510 has its screens in one of the several positions previously described. Specifically, when knob 801 is in the position of FIG. 23, with its notch 819 in engagement with the spring 816, screen 511 is moved to the downwardly swung position shown at FIG. 20. When knob 801 is moved to its far right hand position (FIG. 23) in which spring 818 engages notch 819, screens 511 and 540 are in the upper retracted position shown in phantom lines at FIG. 20.

The step 820 of cam 813 is so arranged that it turns to a position to close switch 814 when knob 801 is moved to a position slightly to the right of its position of engagement with the spring 817. When switch 814 is closed, a camera slide shutter is moved into the path of travel of the electron beam to shut off the beam during the time that screens 511 and 540 are moved to their retracted positions. However, when knob 801 is moved to its far right position, so its notch 819 engages spring 818, switch 814 is again opened by cam 813 so the slide shutter returns to a position in which the electron beam is free to impinge on the surface of the photographic plate 522 (FIG. 18) located immediately beneath the screen assembly 510.

Figure 26:
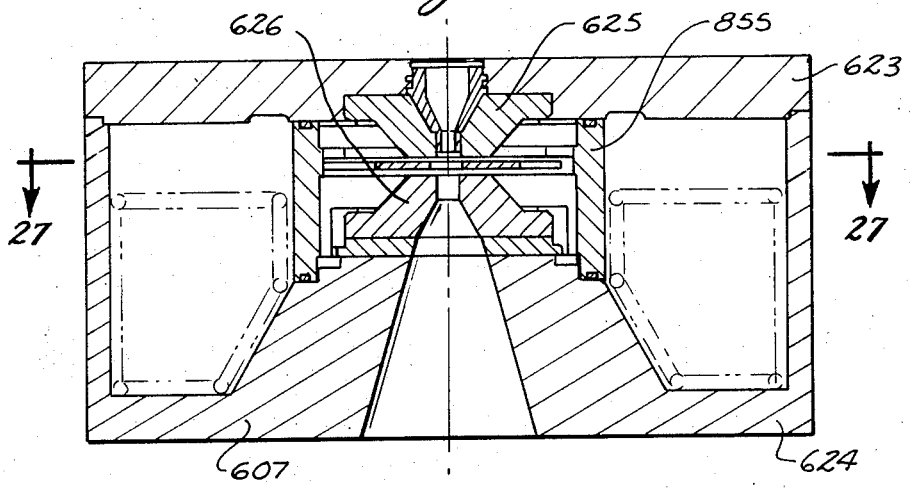
FIG. 26 is a view in section taken through the third projector lens of the microscope of this invention.
Figure 27:
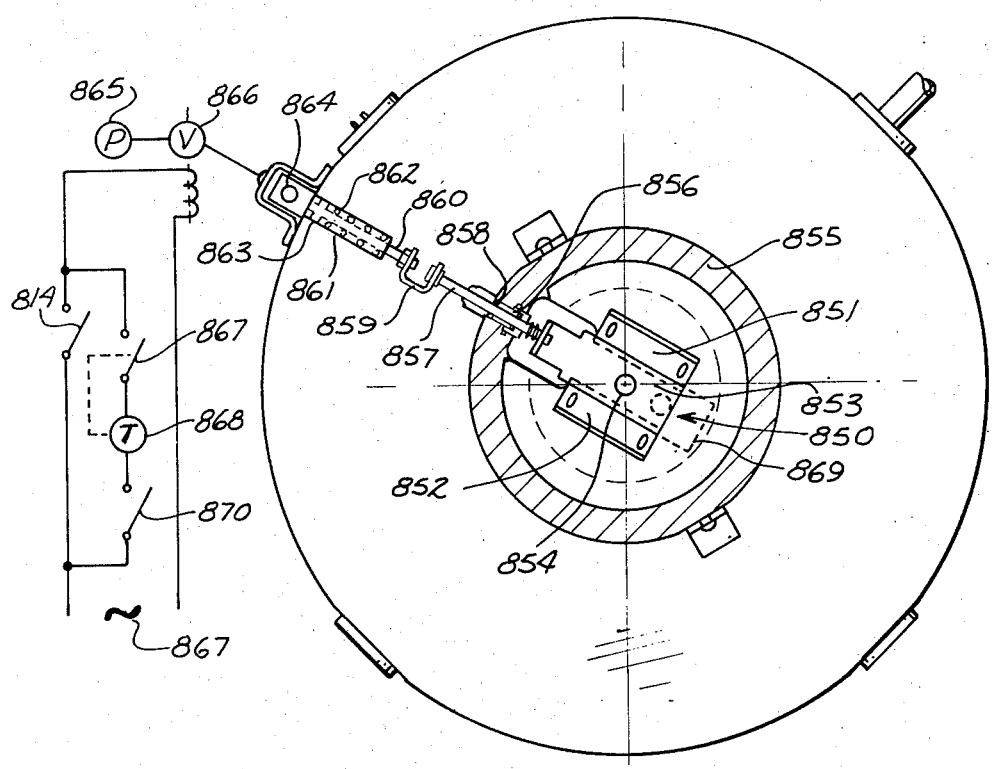
FIG. 27 is a sectional view taken along line 27—27 of FIG. 26 and showing the camera shutter controls of this invention.

Camera shutter assembly 850 is located in the air gap of third projector lens 607 (FIGS. 26 and 27). The shutter includes tracks 851 and 852 which guide a shutter plate 853 in the space between the pole pieces 625 and 626 of the projector lens assembly. Shutter plate 853 is flat and has a relatively large central opening 854 which, when the shutter is open as shown at FIG. 27, is centered on the axis of the electron beam and permits passage of electrons through the projector lens to screen assembly 510 located below this lens. As shown at FIG. 26, a sealing ring 855 of substantial axial height is located between the upper and lower cases 623 and 624 of lens assembly 607. O-ring seals are provided at each end of ring 855 so the space inside the ring is vacuum tight.

A horizontal bore 856 is formed in ring 855 at a location in alignment with the space between pole pieces 625 and 626. A rod 857 secured to shutter plate 853 extends through this opening and is provided with suitable seals 858 to prevent the loss of vacuum from within the ring. A connector 859 connects rod 857 to piston rod 860 of a pneumatic cylinder 861. Cylinder 861 is single acting and has a spring 862 ahead of its piston 863 to normally urge the piston to the position shown in which shutter 853 is open. The rear end of cylinder 861 is connected to a manifold 864 which communicates with a source of pressure air 865 via a solenoid operated valve 866. Advantageously, solenoid valve is located at a distance remote from projector lens 602 so that the magnetic field created when the valve is operated does not disturb the path of the electron beam through the lens or other parts of the microscope. Valve 866 is connected to a power supply 867 via the switch 814 in one of the lines from the power source. A timer operated switch 867, which is normally closed when switch 814 is open, can also be placed in parallel across switch 814 to control the duration of exposure of a photographic plate. Closing switch 814 energizes valve 866 to admit pressure to the rear end of cylinder 861, thereby moving piston 863 and shutter plate 853 to the dotted line position 869 of FIG. 27 where opening 854 is shifted to one side of the beam passage through the lens and the beam is effectively blocked. When valve 866 is de-energized (both switches 814 and 876 open) shutter plate 850 returns to the solid line position of FIG. 27 in which the electron beam passes through the lens and onto the screen or photographic plate below the lens.

When timer controlled switch 867 is provided, the operator of the instrument need only move button 801 to the position in which the notch 819 of the button is aligned with spring 818. In this position of the button 801, switch 814 is open and the opening of switch 814 can be used to actuate timer controlled switch 867 so plate 853 remains in the shutter open position only for a predetermined period of time. Alternatively, switch 870 can be opened to disable timer 868, and under these conditions, the length of the exposure is controlled by the operator who moves knob 801 back to a position in engagement with spring 817 as soon as the desired exposure time has elapsed. Hence, the operator of the instrument has a choice and may select either an automatic exposure or a manually controlled exposure to obtain a photograph of the image projected by the electron beam.

THE MECHANICALLY ENERGIZABLE VACUUM SEAL

Figure 28:
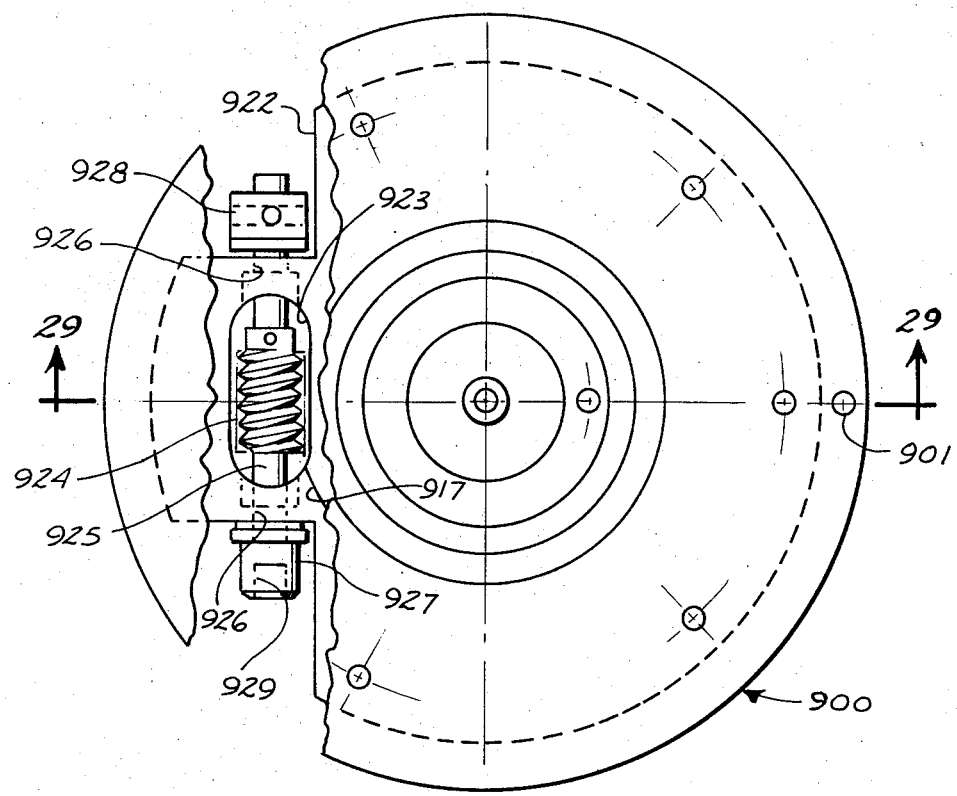
FIG. 28 is a top plan view of an expandable vacuum seal assembly according to this invention.
Figure 29:
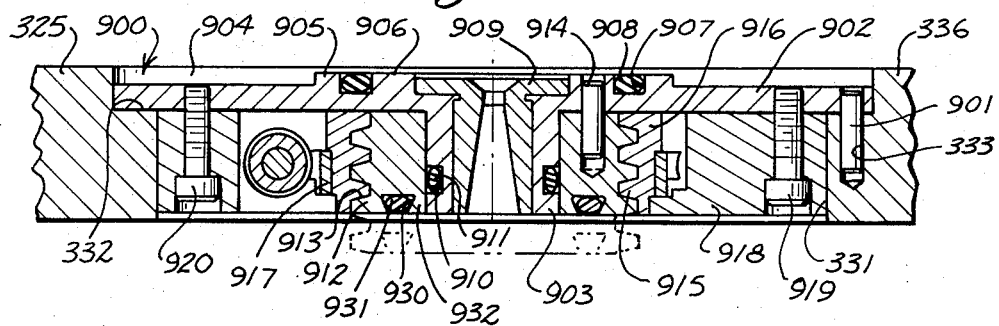
FIG. 29 is a view in section taken along line 29—29 of FIG. 28.

FIGS. 28 and 29 show the vacuum seal arrangement via which a seal is created between certain adjacent lenses of this microscope. As previously explained, with reference to FIG. 7, each of shelves 325–327 has a counterbored opening 331 which defines an upwardly facing shoulder 332. A portion of shelf 325 is reproduced at FIG. 29. With reference to FIGS. 28 and 29, there is shown a vacuum seal assembly 900 in accordance with this invention. Referring to FIG. 29, seal assembly 900 sits in bore 331 of shelf 325 with the seal supported on counterbored shoulder 332 and with a locating pin 901 of the seal assembly in opening 333 of the shelf.

Seal assembly 900 includes a top plate 902 of circular outline having a downwardly projecting central sleeve portion 903 integral with the plate. A part of the top surface 904 of the plate is cut away to provide an elevated central annular portion 905 with a surface 906 above the level of surface 904. Formed in portion 905 is an annular groove 907 in which an O-ring 908 is seated. Plate 902 has a diameter to be received in the counterbored opening on shoulder 332 of shelf 325. There is a central opening through sleeve 903 to receive a beam passage insert 909. Formed in sleeve 903 is an outwardly facing annular groove 910 in which an O-ring seal 911 is seated. Mounted on sleeve 903 for axial movement is a collar 912. Collar 912 has external threads 913 formed thereon. A pin 914 extending through plate 902 and into collar 912 mounts the collar for axial movement and against rotation on sleeve 903. Teeth 915 of an internally threaded ring 916 are engaged with the teeth 913 of collar 912. Secured to the outside of ring is an externally toothed ring gear 917. Collar 912 and threaded ring 916 each have an axial height equal to the ength of sleeve 903. Ring 916 is secured against endwise movement by a body member 918 secured to the bottom of plate 902 with screws 919 and 920. As shown at FIG. 28, body member 918 has portions thereof cut away as at 921 and 922 and is provided with a recess 923 to accommodate a worm 924.

Worm 924 is pinned to a shaft 925 which extends through bores 926 in body 918 at each end of recess 923. A head member 927, secured to one end of shaft 925, prevents movement of the shaft in one direction, and a collar 928, keyed to the other end of the shaft, prevents axial movement of the shaft in the other direction. The enlarged head member 927 advantageously has an Allen head opening 929 to receive a suitable tool for manipulating worm 924 from the front of shelf 325. It is to be appreciated, with reference to FIGS. 8 and 28, that opening 929 in the head 927 will be aligned with bore 334 of shelf 325 when the vacuum seal assembly 900 is located in the shelf 325, as shown at FIG. 29. Formed in the bottom of collar 912 is an O-ring retaining groove 930 in which an O-ring 931 is seated.

With vacuum seal assembly 900 in its de-energized position, as shown at FIG. 20, bottom surface 932 of collar 912 is above the bottom surface of shelf 325. Also, top surface 906 of plate 902 is below the top surface 336 of the shelf. As will be remembered with reference to FIG. 1, shelf 325 supports first condenser lens assembly 602. Immediately beneath shelf 325 is second condenser lens assembly 603. Inserting a tool into opening 929 and rotating worm 924 moves collar 912 downwardly. A portion of the downard movement of the collar is shown at FIG. 29 in phantom lines. When lower face 932 of the collar engages the top surface of second condenser lens 603, further downward movement of the collar is prevented, and the effect of additional rotation of worm 924 is to lift plate 902 and the remainder of the assembly upwardly until its top surface 906 moves upwardly against the bottom of first condenser lens 602. Such movement is permitted by the pin 901 which can slide in the opening 933, but still prevents the seal assembly from rotating relative to the shelf. Hence, the seal assembly 900 first seals against the lens immediately beneath the shelf when surface 932 engages the top of the lens, and then seals against the lens above the shelf as the seal is elevated so surface 906 engages the immediately above lens. As is evident with reference to FIGS. 28 and 29, rotating worm 924 rotates ring gear 917 which in turn rotates ring 916. Since ring 916 is restrained against axial movement, rotation of the ring causes collar 912 to be forced downwardly to move the seal in the manner described.

Since the clearance between the bottom of a shelf and the top of the adjacent lens is quite small, for example, one-eighth inch, and since the lenses which sit on top of a shelf are only slightly elevated above the surface of the shelf, it will be appreciated that vacuum seal assembly 900 need not be expanded to any substantial extent, since a total travel on the order of three-sixteenths is sufficient to energize both top seal 908 and bottom seal 931 of the seal assembly. Of course, seal 911 maintains a vacuum tight connection between collar 912 and sleeve 903.

Figure 30:
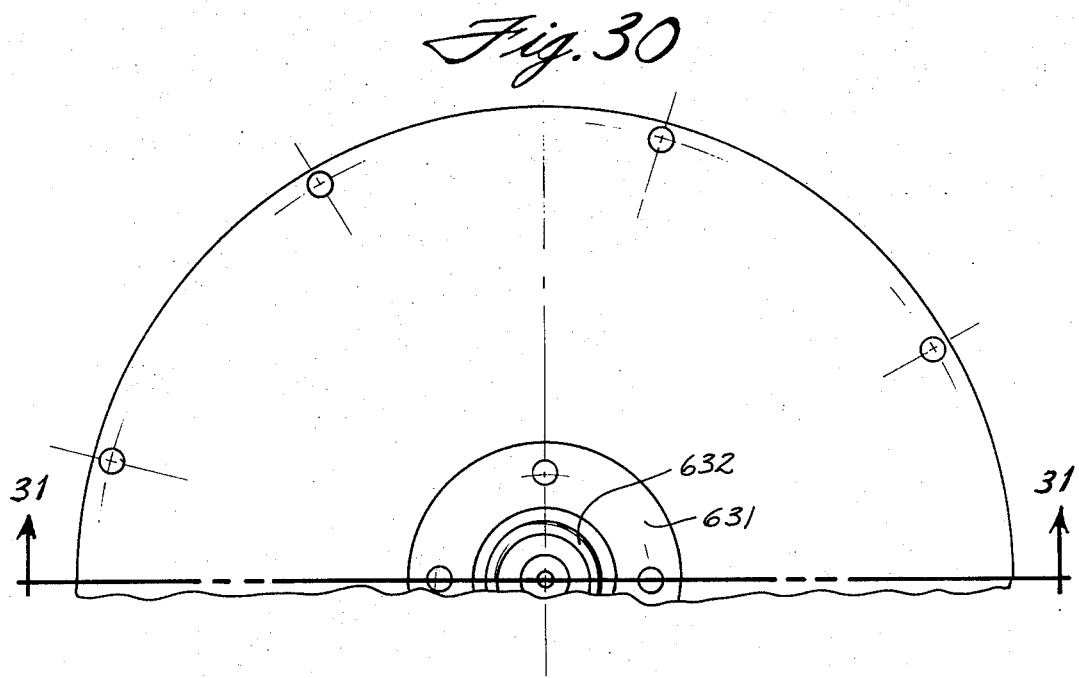
FIG. 30 is a partial view in plan of the first projector lens of the microscope of this invention.
Figure 31:
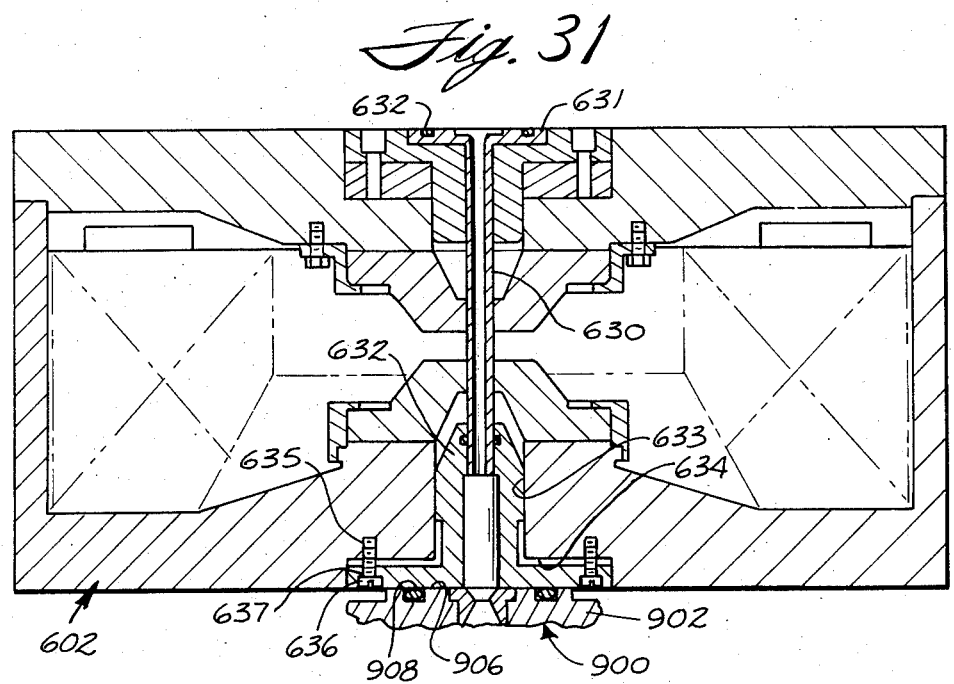
FIG. 31 is a view in vertical section along line 31—31 of FIG. 30.

The manner in which upper projector lens 602 is sealed to the bottom of plate 601 is also unique. In order to provide for removing lens 602, it is necessary that there be no projections above the top of the lens. In the case of condenser lens 602, the unique seal arrangement is shown at FIGS. 30 and 31. With reference to FIG. 31, it will be seen that a tube 630 extends a substantial distance through the center of the lens, the tube having an enlarged flange 631 at its upper end which is integral with the tube. Formed in the top surface of flange 631 is an annular groove to receive O-ring seal 632'. The lower end of tube 630 is threaded into a collar 632 which extends into a counterbored recess 633 which forms a downwardly facing transverse annular shoulder 634 at the bottom of the lens and which receives the flange 635 of collar 632. Collar 632 is free to move vertically within a limited range by virtue of the play provided between the heads 636 of retaining screws which extend through openings in the flange 635 and the counterbored seats 637 against which the underside of the heads of the screws engage. By virtue of this arrangement, when collar 632 is moved upwardly, sleeve 630 and flange 631 are likewise moved upwardly until seal 632 engages and seals against the bottom surface of plate 601 on which power supply 600 is mounted. The assembly including tube 630 and collar 632 are moved upwardly by the vacuum seal assembly 900 located in shelf 325. After the seal assembly engages the top face of second condenser lens 603, further energization of the seal assembly by rotating worm 924 causes plates portion 902 to move upwardly until surface 906 engages the bottom face of collar 632 to thereby force tube 630 and flange 631 upwardly. Further manual manipulation of worm 924 lifts seal 632' into engagement with the bottom surface of plate 601 and at the same time, a seal is formed between seal ring 908 and the bottom surface of flange 635.

With reference to FIG. 1, it will be observed that a plurality of adjusting screws 640 are provided on each of support bars 302–304. With reference to FIG. 2, it was previously explained that the openings 316 provide for proper alignment of the axes of adjusting screws, such as the adjusting screws 340 for lens 602, 603, the assembly of lenses 605 and 606, and lens 607. Hence, it will be appreciated that there are three screws 340 for each of these mentioned lenses and that these screws are mounted one on each of rods 302–304 and have their axes directed toward the center of the lens which the screws are used to adjust. Since the lenses 602, 603, 606, and 607 are each mounted on bearing surfaces, manipulating the screws 340 to adjust the center of the lens relative to the electron beam is readily accomplished.

Since the assembly of projector lenses 605 and 606 is assembled before these two lenses are installed, these lenses are adjusted as a single unit by moving lens 606 which carries lens 605. Advantageously, coarse adjustment of the screws 340 roughly centers the lenses before the several vacuum seals are energized. After the seals are energized, however, the lenses can still be adjusted by appropriate manipulation of the proper ones of adjusting screws 340.

By virtue of the construction of this electron microscope, there is a sealed vacuum chamber which extends around the axis of the electron beam and this chamber communicates with the electron gun region of the microscope, as well as the viewing screen and photographic assembly 500. Suitable vacuum pumps, such as the vacuum pump 501, a diffusion pump (not shown) mounted at a convenient location on the column assembly, and a mechanical pump on the floor 41 are also used to maintain the desired vacuum in the vacuumized portions of the microscope. Advantageously, piping between the mechanical pump and the diffusion pump is so arranged that a length of flexible rubber hose 35 is included in the piping 36 connected between the diffusion pump and mechanical pump 37 and at least a portion of the rubber hose has its axis along the axis of bearing assemblies 100 and 101, as shown at FIG. 2. The flexible hose 35 prevents transmission of vibration to the suspended column assembly.

Because of the ease with which selected lenses of this microscope can be removed from the column, scanning attachments and various other substitutions can be readily made quickly in a relatively short period of time.

While a preferred embodiment of an electron beam microscope, having magnetic lenses has been shown and described, and while the features of this device have been shown and described in connection with an electron microscope, it is to be understood that the invention is not limited to an electron microscope, but that the various features described herein can be used with various electron beam and other corpuscular equipment without departing from the intended scope of this invention as defined in this specification and the appended claims.

What is claimed is:

1. An improved vibration eliminating support system for eliminating the transmission of vibrations from a support to an electron microscope mounted on the support comprising in combination a support frame;

a rigid microscope column;

essentially friction free bearing means on the frame; and mounting means mounting said microscope column on the bearing means for free swinging movement in pendulum fashion on said frame, so that vibrations of said support frame caused by external forces are converted to slow swinging motion of the pendulum supported microscope column.

2. A support system according to claim 1 wherein said bearing means includes an upwardly facing concave surface on said frame, and a downwardly facing convex surface rigid with said column and floating on said concave surface.

3. A support system according to claim 2 wherein said concave and convex surfaces are the bearing and journal portions of a bearing assembly;

said column is rigid with elongated and is secured to said convex surface, and a fluid under pressure between said surfaces floats said convex surface on said concave surface.

4. A support system according to claim 3 wherein said concave and convex surfaces are each spherical.

5. A support system according to claim 3 wherein said concave surface is the concave surface of a bearing of cylindrical curvature, and said convex surface is the convex surface of a journal of the cylindrical curvature.

6. A support system according to claim 5 wherein thrust bearing means limit axial movement of said journal relative to said bearing.

7. A support system according to claim 6 wherein said thrust bearing means includes a shoe on said journal facing an end surface of said bearing, and means to direct fluid under pressure through said end surface.

8. A vibration eliminating support arrangement to isolate an instrument from the effects of external vibration comprising, in combination a support structure;

an instrument support;

low friction bearing means mounting the instrument support on the support structure for free swinging movement about a preselected center; and an instrument, the utility of which can be impaired by vibrations transmitted to the instrument support, the instrument being carried by the instrument support;

the support and instrument having respective centers of mass the resultant of which is below the preselected center of swinging movement of the instrument support so that vibrations of the support structure caused by external forces are converted to slow pendulum type swinging motion of the instrument support and instrument.

9. A support arrangement according to claim 8 wherein the low friction bearing means include a bearing connected to one of said support structure and instrument support, a journal connected to the other of said support structure and instrument support, and means to create a fluid film between the bearing and the journal to maintain the bearing and journal in essentially friction free relation to each other.

10. A support arrangement according to claim 9 wherein the bearing is secured to the support structure; and the journal is secured to the instrument support.

11. A support arrangement according to claim 9 wherein the means to create a fluid film between the bearing and the journal includes a source of pressure fluid, and passage means connected to the pressure fluid source and opening through a bearing surface of the bearing.

12. A support arrangement according to claim 9 wherein the arrangement further includes thrust bearing means to limit relative axial movement of the journal and bearing;

the thrust bearing means comprising an end face of the bearing having a pressure fluid passage opening therethrough, and a thrust shoe rigid with the journal and extending across the passage in opposed relation to the end face of the bearing.

* * * * *